(12) United States Patent
Sugawara

(10) Patent No.: US 6,344,929 B1
(45) Date of Patent: Feb. 5, 2002

(54) ILLUMINATION APPARATUS AND PROJECTION TYPE DISPLAY APPARATUS

(75) Inventor: Saburo Sugawara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/506,346

(22) Filed: Feb. 17, 2000

(30) Foreign Application Priority Data

Feb. 19, 1999 (JP) .......................................... 11-041156

(51) Int. Cl.$^7$ .......................... G02B 27/10; F21V 19/00
(52) U.S. Cl. ...................................... 359/622; 362/268
(58) Field of Search ................................ 359/621, 622, 359/627, 619; 362/268

(56) References Cited

U.S. PATENT DOCUMENTS

| 5,719,706 A | * | 2/1998 | Masumoto et al. | .......... 359/622 |
| 6,208,451 B1 | * | 3/2001 | Itoh | .......... 359/247 |
| 6,246,526 B1 | * | 6/2001 | Okuyama | .......... 359/621 |

FOREIGN PATENT DOCUMENTS

JP 2505758 2/1996

* cited by examiner

Primary Examiner—Ricky Mack
(74) Attorney, Agent, or Firm—Morgan & Finnegan LLP

(57) ABSTRACT

An illumination apparatus has a light-collecting reflector, a light source placed at a position of a focal point of the reflector, a first lens array for condensing light reflected by the reflector, a second lens array disposed at or near a position of a rear focal point of the first lens array, and an optical system for illuminating a surface to be illuminated, with multiple beams from the second lens array. The illumination apparatus satisfies the following condition:

$$0.7 < K1 < 1.3$$

where $K1 = (Larc \times flyf1 / 2fm) / (Lfly2p/2)$ where Larc: a length of a light-emitting portion of the light source along a direction of the optical axis,
flyf1: a focal length of the first lens array,
fm: a focal length of the light-collecting reflector, and
Lfly2p: a length along a longitudinal direction of each lens of the second lens array.

44 Claims, 7 Drawing Sheets

ILLUMINATION APPARATUS AND PROJECTION TYPE DISPLAY APPARATUS

BACKGROUND OF THE INVENTION

1. Field of the Invention

The present invention relates to an illumination apparatus and a projection type display apparatus and, more particularly, to a projector which projects an image (light) supplied from a liquid crystal display element or from a display element of any other type. The invention is suitably applicable to liquid crystal projectors and the like.

2. Related Background Art

A variety of proposals have been made heretofore as to the technology for the liquid crystal projectors constructed to illuminate a liquid crystal panel (liquid crystal display element) with light from a light source and enlarge and project an image based on transmitted light or reflected light modulated by and emerging from the liquid crystal panel, through a projection lens onto a screen.

A TN (Twist Nematic) liquid crystal panel, which is often used in the liquid crystal projectors, is normally provided with polarizing filters such as polarizers, analyzers, or the like before and after a liquid crystal layer.

The polarizing filters have such characteristics as to transmit only a specific polarization component out of incident light but intercept a polarization component whose polarization direction is perpendicular thereto. For this reason, in the liquid crystal projectors, at least half of the light from the light source was intercepted at the polarizing filter on the light incident side of the liquid crystal panel and thus brightness of the image projected on the screen tended to become lowered.

As an illumination apparatus for the liquid crystal projectors, for example, Japanese Patent Application Laid-Open No. 9-311297 suggests the illumination apparatus that uniformly illuminates an area to be illuminated while increasing the utilization efficiency of light from the light source, using polarization converting elements for converting the incident light of non-polarized light into beams of linearly polarized light polarized in a specific direction and two lens arrays (optical integrators) placed in series for uniformly illuminating the area on the surface to be illuminated.

FIG. 10 is a schematic diagram to show the major part of the illumination apparatus suggested in the above Japanese application. In FIG. 10, a polarization generator 20 has a first optical element 200 for creating a plurality of intermediate beams 202 (condensed images 203) spatially separated from each other, from light emitted from a light source section 10 consisting of a light source 101 and a parabolic mirror 102, and a second optical element 300 placed near the position of convergence of the plurality of intermediate beams 202 and having a polarization separating unit array 320 consisting of a polarization separating film array 330 for spatially separating each intermediate beam 202 into two kinds of polarized light beams having respective polarization directions different from each other, a half-wave phase plate array 381 for aligning the polarization direction of the polarized beams of the first kind with that of the polarized beams of the second kind to form linearly polarized light beams of one kind, and a reflecting surface array 332, a condenser lens array 310 consisting of a plurality of condenser lenses 311, and an exit-side lens.

In the first optical element 200, beam splitting lenses 201 arranged adjacently in the Y-direction are placed in a shifted state from each other in the X-direction each by a distance corresponding to approximately a half length of the array pitch thereof in the X-direction, which can improve nonuniformity of light intensity distribution of the light from the light source. In addition, the above Japanese application also discloses a color liquid crystal projector having the polarization generator illustrated in FIG. 10, a color separating means, three liquid crystal panels, a color combining means, and a projection lens.

In each of the embodiments proposed in the above Japanese application, there is no numerical data of the illumination optical system disclosed and it is thus indefinite as to the relation between the focal length of the parabolic reflector and the focal length of the first lens array and the like.

For this reason, designed values (configurations) for yielding the best illumination efficiency were unknown. The projection type display device of FIG. 12 in the above Japanese application also had the drawback of poor light-condensing nature of light onto the entrance pupil of the projection lens, because there was no condenser lens near the liquid crystal panel.

Further, it also describes nothing about detailed structure of the microlenses used for increasing an aperture ratio of the liquid crystal panel.

SUMMARY OF THE INVENTION

An object of the present invention is to provide an illumination apparatus and a projection type display apparatus with higher light utilization efficiency than before.

An illumination apparatus according to one aspect of the present invention is an illumination apparatus comprising a light-collecting reflector, a light source placed at a position of a focal point of the reflector, a first lens array for condensing light reflected by the reflector, a second lens array disposed at or near a position of a rear focal point of the first lens array, and an optical system for illuminating a surface to be illuminated, with multiple beams from the second lens array, said illumination apparatus satisfying the following condition:

$$0.7 < K1 < 1.3 \tag{1}$$

where $K1 = (Larc \times flyf1/2fm)/(Lfly2p/2)$ where Larc: a length of a light-emitting portion of said light source along a direction of the optical axis, flyf1: a focal length of said first lens array, fm: a focal length of said light-collecting reflector, and Lfly2p: a length along a longitudinal direction of an entrance surface of each lens of said second lens array.

Another illumination apparatus according to a further aspect of the present invention is an illumination apparatus comprising a first lens array for condensing light from a light source, a second lens array disposed at or near a position of a rear focal point of the first lens array, a first optical system for condensing multiple beams from the second lens array, and a second optical system for illuminating a surface to be illuminated, with said multiple beams from the first optical system, said illumination apparatus satisfying the following condition:

$$0.95 < K2 < 1.15 \tag{2}$$

where $K2 = (Lfly1p \times fc12/flyf2)/Ldsp$ where Ldsp: a diagonal length of said surface to be illuminated, flyf2: a focal length of said second lens array, fc12: a composite focal length of said first lens system and said second lens system, and Lfly1p: a diagonal length of each lens of said first lens array.

Another illumination apparatus according to a further aspect of the present invention is an illumination apparatus comprising a first lens array for condensing light from a light source, a second lens array disposed at or near a position of a rear focal point of the first lens array, a first optical system for condensing multiple beams from the second lens array, and a second optical system for illuminating a surface to be illuminated, with the multiple beams from the first optical system, said illumination apparatus satisfying the following condition:

$$0.9 < K3 < 1.4 \tag{3}$$

where $K3 = fc1/fc2$ where fc1: a focal length of said first optical system, and fc2: a focal length of said second optical system.

Another illumination apparatus according to a further aspect of the present invention is an illumination apparatus comprising a first lens array for condensing light from a light source, a second lens array disposed at or near a position of a rear focal point of the first lens array, a first optical system for condensing multiple beams from the second lens array, and a second optical system for illuminating a display device with the multiple beams from the first optical system, said display device comprising a display part in which a plurality of pixels of a rectangular shape are arrayed, and a microlens array placed on the light incidence side of the display part, said illumination apparatus satisfying the following condition:

$$0.6 < K4 < 1.6 \tag{4}$$

where $K4 = (Dmicro/F12c)/Lop$ where F12c: a composite F-number of said first optical system and said second optical system, Dmicro: an equivalent air distance from principal points of microlenses of said microlens array on the side of said display part, to apertures of the pixels of the display device, and Lop: an aperture width along a longitudinal direction of the pixels of said display device.

Another illumination apparatus according to a further aspect of the present invention is an illumination apparatus comprising a first lens array for condensing light from a light source, a second lens array disposed at or near a position of a rear focal point of the first lens array, and an optical system for illuminating an image display device with multiple beams from the second lens array, said image display device comprising a display part in which a plurality of pixels are arrayed, and a microlens array placed on the light incidence side of the display part, said illumination apparatus satisfying the following condition:

$$2 < K5 < 4.5 \tag{5}$$

where $K5 = fmicro/Dmicro$ where Dmicro: an equivalent air distance from principal points of microlenses of said microlens array on the display part side of said display device, to apertures of the pixels of said display device, and fmicro: a focal length of the microlenses.

A projection type display apparatus according to a further aspect of the present invention is a projection type display apparatus comprising a first lens array for condensing light from a light source, a second lens array disposed at or near a position of a rear focal point of the first lens array, a first optical system for condensing multiple beams from the second lens array, a second optical system for illuminating an image display device with the multiple beams from the first optical system, said image display device comprising a display part in which a plurality of pixels are arrayed, and a microlens array placed on the light incidence side of the display part, and a projection optical system for projecting image light from the image display device, said projection type display apparatus satisfying the following condition:

$$0.6 < K6 < 1.5 \tag{6}$$

where $K6 = Fpj/F12c$ where F12c: a composite F-number of said first optical system and said second optical system, and Fpj: an F-number of said projection optical system.

Another projection type display apparatus according to a further aspect of the present invention is a projection type display apparatus comprising a first lens array for condensing light from a light source, a second lens array disposed at or near a position of a rear focal point of the first lens array, an optical system for condensing multiple beams from the second lens array and illuminating an image display device therewith, said image display device comprising a display part in which a plurality of pixels are arrayed, and a microlens array placed on the light incidence side of the display part, and a projection optical system for projecting image light from the display device, said projection type display apparatus satisfying the following condition:

$$0.35 < K7 < 0.85 \tag{7}$$

where $K7 = Fpj/Fmicro$ where Fpj: an F-number of said projection optical system, and Fmicro: an F-number of microlenses of said microlens array.

Another illumination apparatus according to a further aspect of the present invention is an illumination apparatus comprising a first lens array for condensing light from a light source, a second lens array disposed at or near a position of a rear focal point of the first lens array, and an optical system for condensing multiple beams from the second lens array and illuminating an image display device therewith, said image display device comprising a display part in which a plurality of pixels of a rectangular shape are arrayed, and microlens arrays placed on the light incidence side and on the light emergence side of the display part, said illumination apparatus satisfying the following conditions:

$$1.3 < K8 < 2.5 \tag{8}$$

$$1.3 < K9 < 2.5 \tag{9}$$

where $K8 = fmicrok/Dmicrok$ and $K9 = fmicros/Dmicros$ where fmicrok: a focal length of microlenses of said microlens array on said light incidence side, Dmicrok: a distance between principal points on the side of said display part, of said microlenses on said light incidence side and apertures of the pixels of said display part, fmicros: a focal length of microlenses of said microlens array on said light emergence side, and Dmicros: a distance between principal points on the side of said display part, of said microlenses on said light emergence side and the apertures of the pixels of said display part.

Another projection type display apparatus according to a further aspect of the present invention is a projection type display apparatus comprising a first lens array for condensing light from a light source, a second lens array disposed at or near a position of a focal point of the first lens array, a first optical system for condensing multiple beams from the second lens array, a second optical system for illuminating an image display device with the multiple beams from the first optical system, said image display device comprising a display part in which a plurality of pixels are arrayed, and a projection optical system for projecting image light from the image display device, said projection type display apparatus satisfying the following condition:

$$0.6 < K10 < 1.6 \tag{10}$$

where K10=Fpj/F12c where F12c: a composite F-number of said first optical system and said second optical system, and Fpj: an F-number of said projection optical system.

Another projection type display apparatus according to a further aspect of the present invention is a projection type display apparatus comprising a first lens array for condensing light from a light source, a second lens array disposed at or near a position of a rear focal point of the first lens array, an optical system for condensing multiple beams from the second lens array and illuminating an image display device therewith, said image display device comprising a display part in which a plurality of pixels are arrayed, and microlens arrays placed on the light incidence side and on the light emergence side of the display part, and a projection optical system for projecting image light from the image display device, said projection type display apparatus satisfying the following conditions:

$$0.7 < K11 < 1.2 \tag{11}$$

$$0.7 < K12 < 1.2 \tag{12}$$

where K11=Fpj/Fmicrok and

K12=Fpj/Fmicros where Fpj: an F-number of said projection optical system,

Fmicrok: an F-number of microlenses of said microlens array on said light incidence side, and Fmicros: an F-number of microlenses of said microlens array on said light emergence side.

In a preferred form of the illumination apparatus described above, a polarization converting element is provided on the side of a light exit surface of said second lens array.

In a preferred form of the projection type display apparatus described above, a polarization converting element is provided on the side of a light exit surface of said second lens array.

In a preferred form of the above illumination apparatus, said light-collecting reflector is comprised of a parabolic reflector.

In a preferred form of the above illumination apparatus, said light source is located at or near the focal point of the parabolic reflector and said reflector outputs nearly parallel beams.

In a preferred form of the above projection type display apparatus, said light source is located at or near the focal point of the parabolic reflector and said reflector outputs nearly parallel beams.

Another projection type display apparatus according to a further aspect of the present invention is a projection type display apparatus which projects image information from a liquid crystal panel placed at a surface to be illuminated, which is illuminated by the illumination apparatus as set forth, through a projection lens.

Another illumination apparatus according to a further aspect of the present invention is an illumination apparatus comprising a first lens array for condensing light from a light source, a second lens array disposed at or near a position of a rear focal point of the first lens array, and an optical system for illuminating an image display device with multiple beams from the second lens array, said image display device comprising a display part in which a plurality of pixels are arrayed, and a microlens array placed on the light incidence side of the display part, wherein a plurality of microlenses constituting the microlens array are comprised of a stack of plural layers, a layer having the highest refractive index out of the plural layers has a lens surface convex on the light incidence side, and an index difference between refractive indices of media on the both sides of the lens surface is not less than 0.1.

Another illumination apparatus according to a further aspect of the present invention is an illumination apparatus comprising a first lens array for condensing light from a light source, a second lens array disposed at or near a position of a rear focal point of the first lens array, and an optical system for illuminating an image display device with multiple beams from the second lens array, said image display device comprising a display part in which a plurality of pixels are arrayed, and a microlens array placed on the light incidence side of the display part, wherein each microlens constituting the microlens array comprises two or more refracting surfaces having light condensing action.

Another illumination apparatus according to a further aspect of the present invention is an illumination apparatus comprising a first lens array for condensing light from a light source, a second lens array disposed at or near a position of a rear focal point of the first lens array, and an optical system for illuminating an image display device with multiple beams from the second lens array, said image display device comprising a display part in which a plurality of pixels are arrayed, and a microlens array placed on the light incidence side of the display part, wherein said microlens array is comprised of a stack of plural layers and a layer having the highest refractive index out of the plural layers is of a double-convex shape.

Another illumination apparatus according to a further aspect of the present invention is an illumination apparatus comprising a first lens array for condensing light from a light source, a second lens array disposed at or near a position of a rear focal point of the first lens array, and an optical system for illuminating an image display device with multiple beams from the second lens array, said image display device comprising a display part in which a plurality of pixels are arrayed, and microlens arrays placed on the light incidence side and on the light emergence side of the display part, wherein a layer having the highest refractive index out of layers forming each lens of the microlens array on the light incidence side has a lens surface convex on the light incidence side and an index difference between refractive indices of media on the both sides of the lens surface of the lens is not less than 0.1 and wherein a layer having the highest refractive index out of layers forming each lens of the microlens array on the light emergence side has a lens surface convex on the light emergence side and an index difference between refractive indices of media on the both sides of the lens surface of the lens is not less than 0.2.

Another illumination apparatus according to a further aspect of the present invention is an illumination apparatus comprising a first lens array for condensing light from a light source, a second lens array disposed at or near a position of a rear focal point of the first lens array, and an optical system for illuminating an image display device with multiple beams from the second lens array, said image display device comprising a display part in which a plurality of pixels are arrayed, and microlens arrays placed on the light incidence side and on the light emergence side of the display part, wherein each of the microlens arrays is comprised of a stack of plural layers and a layer having the highest refractive index out of the plural layers is of a double-convex shape.

Another illumination apparatus according to a further aspect of the present invention is an illumination apparatus comprising a first lens array for condensing light from a light source, a second lens array disposed at or near a position of a rear focal point of the first lens array, and a lens system for illuminating an image display device with multiple beams from the second lens array, said image display device comprising a display part in which a plurality of pixels are arrayed, and microlens arrays placed on the light incidence side and on the light emergence side of the display part, wherein each lens of the microlens arrays on the light incidence side and on the light emergence side comprises two or more refracting surfaces having light condensing action.

In a preferred form of the illumination apparatus described above, a polarization converting element is provided on the side of a light exit surface of said second lens array.

In a preferred form of the above illumination apparatus, said light source is located at or near the focal point of a parabolic reflector and said reflector outputs nearly parallel beams.

Another projection type display apparatus according to a further aspect of the present invention is a projection type display apparatus which projects image information from a liquid crystal panel placed at a surface to be illuminated, which is illuminated by the illumination apparatus as set forth, through a projection lens.

Another illumination apparatus according to a further aspect of the present invention is an illumination apparatus comprising a first optical system for condensing light from a light source, and a second optical system for illuminating a surface to be illuminated, with beams from the first optical system, said illumination apparatus satisfying the following condition:

$$0.9 < K3 < 1.4 \qquad (3)$$

where K3=fc1/fc2
where fc1: a focal length of said first optical system, and
fc2: a focal length of said second optical system.

Another illumination apparatus according to a further aspect of the present invention is an illumination apparatus comprising a first optical system for condensing light from a light source, and a second optical system for condensing light from the first optical system and illuminating an image display device therewith, said image display device comprising a display part in which a plurality of pixels of a rectangular shape are arrayed, and a microlens array placed on the light incidence side of the display part, said illumination apparatus satisfying the following condition:

$$0.6 < K4 < 1.6 \qquad (4)$$

where K4=(Dmicro/F12c)/Lop
where F12c: a composite F-number of said first optical system and said second optical system,
Dmicro: an equivalent air distance from principal points on the side of said display part, of said microlens array, to apertures of the pixels of said display part, and
Lop: an aperture width along a longitudinal direction of the pixels of said display part.

Another illumination apparatus according to a further aspect of the present invention is an illumination apparatus comprising an optical system for illuminating an image display device with light from a light source, said image display device comprising a display part in which a plurality of pixels are arrayed, and a microlens array placed on the light incidence side of the display part, said illumination apparatus satisfying the following condition:

$$2 < K5 < 4.5 \qquad (5)$$

where K5=fmicro/Dmicro
where Dmicro: an equivalent air distance from principal points on the side of said display part, of said microlens array, to apertures of the pixels of said display part, and
fmicro: a focal length of said microlens array.

Another projection type display apparatus according to a further aspect of the present invention is a projection type display apparatus comprising a first optical system for condensing light from a light source, a second optical system for illuminating an image display device with beams from the first optical system, said image display device comprising a display part in which a plurality of pixels are arrayed, and a microlens array placed on the light incidence side of the display part, and a projection optical system for projecting image information from the image display device, said projection type display apparatus satisfying the following condition:

$$0.6 < K6 < 1.5 \qquad (6)$$

where K6=Fpj/F12c
where F12c: a composite F-number of said first optical system and said second optical system, and
Fpj: an F-number of said projection optical system.

Another projection type display apparatus according to a further aspect of the present invention is a projection type display apparatus comprising an optical system for condensing light from a light source and illuminating an image display device therewith, said image display device comprising a display part in which a plurality of pixels are arrayed, and a microlens array placed on the light incidence side of the display part, and a projection optical system for projecting image information from the image display device, said projection type display apparatus satisfying the following condition:

$$0.35 < K7 < 0.85 \qquad (7)$$

where K7=Fpj/Fmicro where Fpj: an F-number of said projection optical system, and Fmicro: an F-number of said microlens array.

Another illumination apparatus according to a further aspect of the present invention is an illumination apparatus comprising an optical system for condensing light from a light source and illuminating an image display device therewith, said image display device comprising a display part in which a plurality of pixels of a rectangular shape are arrayed, and microlens arrays placed on the light incidence side and on the light emergence side of the display part, said illumination apparatus satisfying the following conditions:

$$1.3 < K8 < 2.5 \tag{8}$$

$$1.3 < K9 < 2.5 \tag{9}$$

where K8=fmicrok/Dmicrok and
K9=fmicros/Dmicros where fmicrok: a focal length of said microlens array on said light incidence side, Dmicrok: a distance between principal points on the side of said display part, of said microlens array on said light incidence side and apertures of the pixels of said display part, fmicros: a focal length of said microlens array on said light emergence side, and Dmicros: a distance between principal points on the side of said display part, of said microlens array on said light emergence side and the apertures of the pixels of said display part.

Another projection type display apparatus according to a further aspect of the present invention is a projection type display apparatus comprising a first optical system for condensing light from a light source, a second optical system for illuminating an image display device with beams from the first optical system, said image display device comprising a display part in which a plurality of pixels are arrayed, and a projection optical system for projecting image information from the image display device, said projection type display apparatus satisfying the following condition:

$$0.6 < K10 < 1.6 \tag{10}$$

where K10=Fpj/F12c where F12c: a composite F-number of said first optical system and said second optical system, and Fpj: an F-number of said projection optical system.

Another projection type display apparatus according to a further aspect of the present invention is a projection type display apparatus comprising an optical system for condensing light from a light source and illuminating an image display device therewith, said image display device comprising a display part in which a plurality of pixels are arrayed, and microlens arrays placed on the light incidence side and on the light emergence side of the display part, and a projection optical system for projecting image information from the image display device, said projection type display apparatus satisfying the following conditions:

$$0.7 < K11 < 1.2 \tag{11}$$

$$0.7 < K12 < 1.2 \tag{12}$$

where K11=Fpj/Fmicrok and
K12=Fpj/Fmicros where Fpj: an F-number of said projection optical system, Fmicrok: an F-number of said microlens array on said light incidence side, and Fmicros: an F-number of said microlens array on said light emergence side.

In a preferred form of the illumination apparatus described above, said light source is located at or near the focal point of a parabolic reflector and said reflector outputs nearly parallel beams.

In a preferred form of the projection type display apparatus described above, said light source is located at or near the focal point of a parabolic reflector and said reflector outputs nearly parallel beams.

Another projection type display apparatus according to a further aspect of the present invention is a projection type display apparatus which projects image information from a liquid crystal panel placed at a surface to be illuminated, which is illuminated by the illumination apparatus as set forth, through a projection optical system.

Another illumination apparatus according to a further aspect of the present invention is an illumination apparatus comprising an optical system for illuminating an image display device with light from a light source, said image display device comprising a display part in which a plurality of pixels are arrayed, and a microlens array placed on the light incidence side of the display part, wherein said microlens array is comprised of a stack of plural layers, a layer having the highest refractive index out of the plural layers has a lens surface convex on the light incidence side, and an index difference between refractive indices of media on the both sides of the lens surface of the lens is not less than 0.1.

Another illumination apparatus according to a further aspect of the present invention is an illumination apparatus comprising an optical system for illuminating an image display device with light from a light source, said image display device comprising a display part in which a plurality of pixels are arrayed, and a microlens array placed on the light incidence side of the display part, wherein each microlens constituting said microlens array comprises two or more refracting surfaces having light condensing action.

Another illumination apparatus according to a further aspect of the present invention is an illumination apparatus comprising an optical system for illuminating an image display device with light from a light source, said image display device comprising a display part in which a plurality of pixels are arrayed, and a microlens array placed on the light incidence side of the display part, wherein said microlens array is comprised of a stack of plural layers and a layer having the highest refractive index out of the plural layers comprises lenses of a double-convex shape.

Another illumination apparatus according to a further aspect of the present invention is an illumination apparatus comprising an optical system for illuminating an image modulating device with light from a light source, said image modulating device comprising a display part in which a plurality of pixels are arrayed, and microlens arrays placed on the light incidence side and on the light emergence side of the display part, wherein a layer having the highest refractive index out of layers forming said microlens array on the light incidence side has a lens surface convex on the light incidence side and an index difference between refractive indices of media on the both sides of the lens surface is not less than 0.1 and wherein a layer having the highest refractive index out of layers forming the microlens array on the light emergence side has a lens surface convex on the light emergence side and an index difference between refractive indices of media on the both sides of the lens surface is not less than 0.2.

Another illumination apparatus according to a further aspect of the present invention is an illumination apparatus comprising an optical system for illuminating an image display device with light from a light source, said image display device comprising a display part in which a plurality of pixels are arrayed, and microlens arrays placed on the light incidence side and on the light emergence side of the display part, wherein each of said microlens arrays is comprised of a stack of plural layers and a layer having the highest refractive index out of the plural layers forming the microlens array comprises lenses of a double-convex shape.

Another illumination apparatus according to a further aspect of the present invention is an illumination apparatus comprising an optical system for illuminating an image display device with light from a light source, said image display device comprising a display part in which a plurality of pixels are arrayed, and microlens arrays placed on the light incidence side and on the light emergence side of the display part, wherein each of the microlens array on the light incidence side and the microlens array on the light emergence side is an array of lenses, each lens comprising two or more refracting surfaces having light condensing action.

In a preferred form of the illumination apparatus described above, said light source is located at or near the focal point of a parabolic reflector and said reflector outputs nearly parallel beams.

Another projection type display apparatus according to a further aspect of the present invention is a projection type display apparatus which projects image information from a liquid crystal panel placed at a surface to be illuminated, which is illuminated by the illumination apparatus as set forth, through a projection optical system.

DETAILED DESCRIPTION OF THE PREFERRED EMBODIMENTS

A projection type display apparatus having the illumination apparatus according to the present invention will be described by reference to the drawings.

Figure 1:
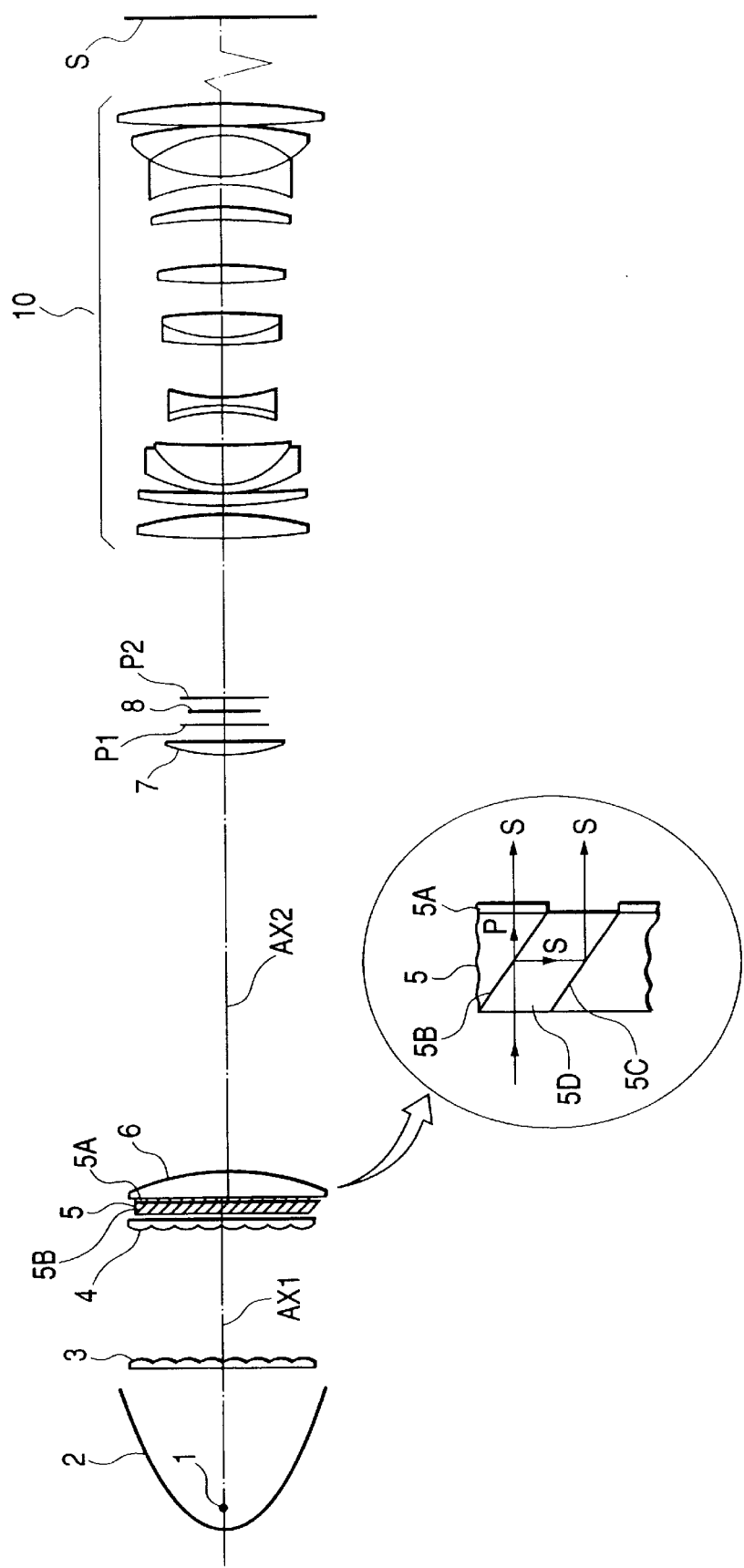
FIG. 1 is a cross-sectional view along the longitudinal direction of Numerical Example 1 of the whole optical system of the projection type display apparatus according to the present invention.
Figure 2:
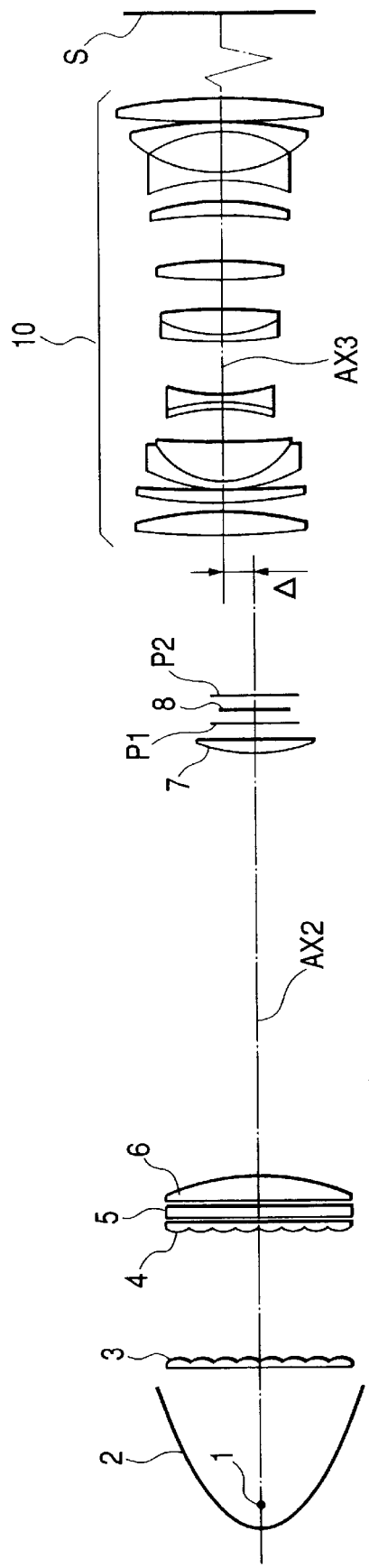
FIG. 2 is a cross-sectional view along the transverse direction of Numerical Example 1 of the whole optical system of the projection type display apparatus according to the present invention.

FIG. 1 and FIG. 2 are cross-sectional views along the longitudinal direction and along the transverse direction, respectively, of a rectangular display part 8 in the projection type display apparatus of Numerical Example 1 of the present invention. This display apparatus is a liquid crystal projector of a single panel type. Although Numerical Example 1 presents values in the structure incorporating a cross dichroic prism, this prism is excluded in the case of color projectors of the single panel type or monochromatic projectors.

In FIG. 1 and FIG. 2, a bundle of rays emitted from the light source 1 are collected and reflected by a parabolic mirror 2 as a collecting reflector so that the rays become nearly parallel to the optical axis. The parallel beam is then incident to a first lens array 3. This array 3 forms an image of the light source 1 at the center of each lens of a second lens array 4. Here the light source 1 and the parabolic mirror 2 compose a light source section for emitting the parallel beam consisting of a bundle of rays parallel to the optical axis.

The focal length (flyf1) of the first lens array 3 is equal to that (flyf2) of the second lens array 4, and the first lens array 3 and second lens array 4 are spaced from each other at the distance equal to the focal length of the first and second lens arrays 3, 4.

Each of a plurality of beams split and condensed by the first lens array 3 is separated into a p-wave and an s-wave by a polarization separating layer 5B of a polarization converting element array 5. The polarization separating layer 5B transmits the p-wave but reflects the s-wave. Each of half-wave plates 5A converts the phase of the p-wave into the direction of the polarization axis of the s-wave. The s-wave is reflected by each reflecting layer (comprised of a polarization separating film) to travel in parallel to the p-wave. Here the p-wave means p-polarized light and the s-wave s-polarized light whose polarization direction is perpendicular to that of the p-wave.

Based on this structure, all the beams emerging from the polarization converting element array 5 become polarized light having the polarization axis along the same direction. Further, the beams emerging from the respective elements of the polarization converting element array 5 are deflected by a first condenser lens system 6 and then travel through a second condenser lens system 7 to overlap each other on the display part 8 of the image display device (liquid crystal panel) as a surface to be illuminated.

The second condenser lens 7 condenses the light emerging from the first condenser lens 6 onto the entrance pupil of the projection lens 10. The first and second condenser lenses 6 and 7 compose a lens system for illumination. The projection lens 10 projects image information displayed on the display part 8 onto the screen S.

In the present embodiment optical integrators such as optical pipes or the like may also be used instead of the first and second lens arrays 3, 4. Further, the light from the light source section (1, 2) may also be arranged to be incident directly to the first condenser lens 6.

The optical axis AX2 of the system from the first condenser lens 6 is shifted in the array direction of the prisms 5D by half of the pitch of the prisms 5D of the polarization converting element array 5 relative to the optical axis AX1 of the system from the light source 1 to the polarization converting element array 5, whereby viewing angles of the polarization converting element array 5 from the display part 8 of the image display device are made equal to each other between the left and right prisms, thereby enhancing parallelism of beams incident to the display part 8.

FIG. 2 shows a state of placement in which the optical axis AX3 of the projection lens 10 is shifted by Δ in the transverse direction of the display part B with respect to the optical axis AX2 so that the projected image on the screen S can be projected preferably to an upper position above the projection type display apparatus.

Figure 3:
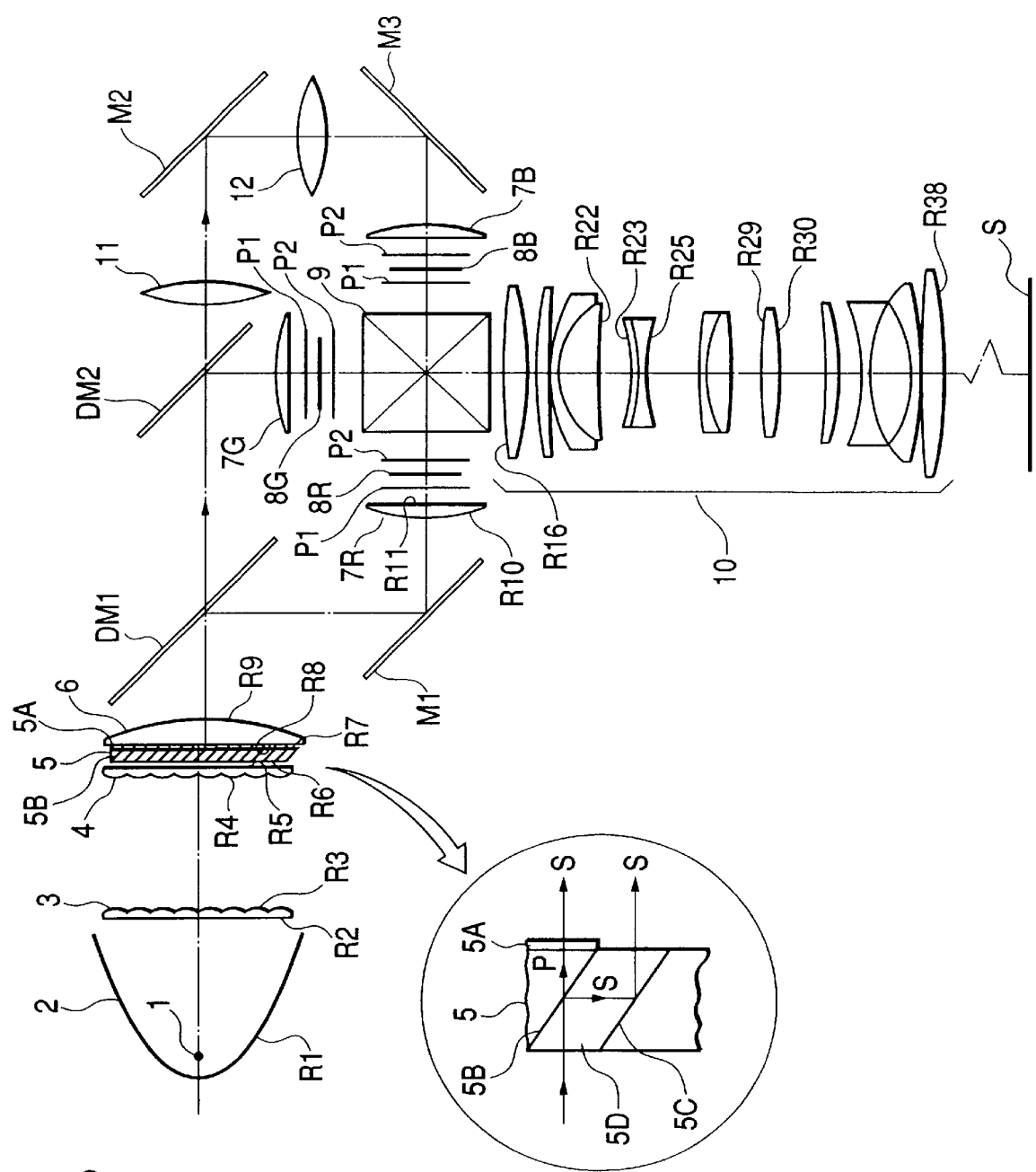
FIG. 3 is a cross-sectional view along the longitudinal direction of Numerical Example 1 of the whole optical system of the projection type display apparatus according to the present invention.

FIG. 3 is a cross-sectional view of the major part of the second projection type display apparatus based on Numerical Example 1 of the present invention. FIG. 3 shows an example of application of the present invention to a color liquid crystal projector of the three panel type. In FIG. 3, the bundle of rays emitted from the light source 1 are collected and reflected by the parabolic mirror 2 so that the rays become nearly parallel to the optical axis. The parallel beam is then incident to the first lens array 3 and this array 3 forms an image of the light source 1 at the center of each lens of the second lens array 4.

The focal length (flyf1) of the first lens array 3 is equal to that (flyf2) of the second lens array 4, and the first lens array 3 and second lens array 4 are spaced at the distance equal to the focal length of the first and second lens arrays 3, 4.

Each of a plurality of beams split and condensed by the first lens array 3 is separated into a p-wave and an s-wave. The polarization separating layer 5B transmits the p-wave but reflects the s-wave. The half-wave plate 5A converts the phase of the p-wave into the direction of the polarization axis of the s-wave. These structure and action are the same as in the previous embodiment.

According to this, all the beams emerging from the polarization converting element array 5 become polarized light having the polarization axis along the same direction. Further, the beams emerging from the respective elements of the polarization converting element array 5 are incident to the first condenser lens 6.

Among the light emerging from the first condenser lens 6, a dichroic mirror DM1 reflects the red light thereof but transmits the remaining green light and blue light. The red light reflected by the dichroic mirror DM1 is guided via a reflecting mirror M1 and a second condenser lens 7R to a display part 8R of an image display device for red. The light transmitted by the dichroic mirror DM1 is separated into the green light and blue light by a dichroic mirror DM2. The green light is reflected by the dichroic mirror DM2 to be guided through a second condenser lens 7G to a display part 8G of an image display device for green.

The blue light transmitted by the dichroic mirror DM2 is condensed by a condenser lens 11, is reflected by a reflecting mirror M2, is condensed by a relay lens 12, is reflected by a reflecting mirror M3, and is condensed by a second condenser lens 7B to be guided to a display part 8B of an image display device for blue. Beams of the respective colors of R, G, and B modulated each based on image information by the respective display parts 8R, 8G, 8B of the image display devices are color-combined by a cross dichroic prism 9 and thereafter the composite light is incident to the projection lens 10. The lens 10 enlarges and projects a full color image onto the screen S.

The projection lens 10 is an optical system telecentric on the light entrance side and is thus designed to be telecentric to the display parts 8 of the image display devices. Angles of incidence of principal rays to the cross dichroic prism 9 are designed to be constant independent of places on dichroic films, so that no chromatic irregularity occurs due to variations in angles of incidence to the dichroic films.

The optical axis AX2 of the system from the first condenser lens 6 is shifted in the array direction of the prisms 5D by half of the pitch of the prisms 5D of the polarization converting element array 5 relative to the optical axis AX1 of the system from the light source 1 to the polarization converting element array 5, as in the case of the apparatus illustrated in FIG. 2, whereby viewing angles of the polarization converting element array 5 from the display parts 8 of the image display devices are made equal to each other between the left and right prisms, thereby enhancing the parallelism of beams incident to the display parts 8.

Figure 4:
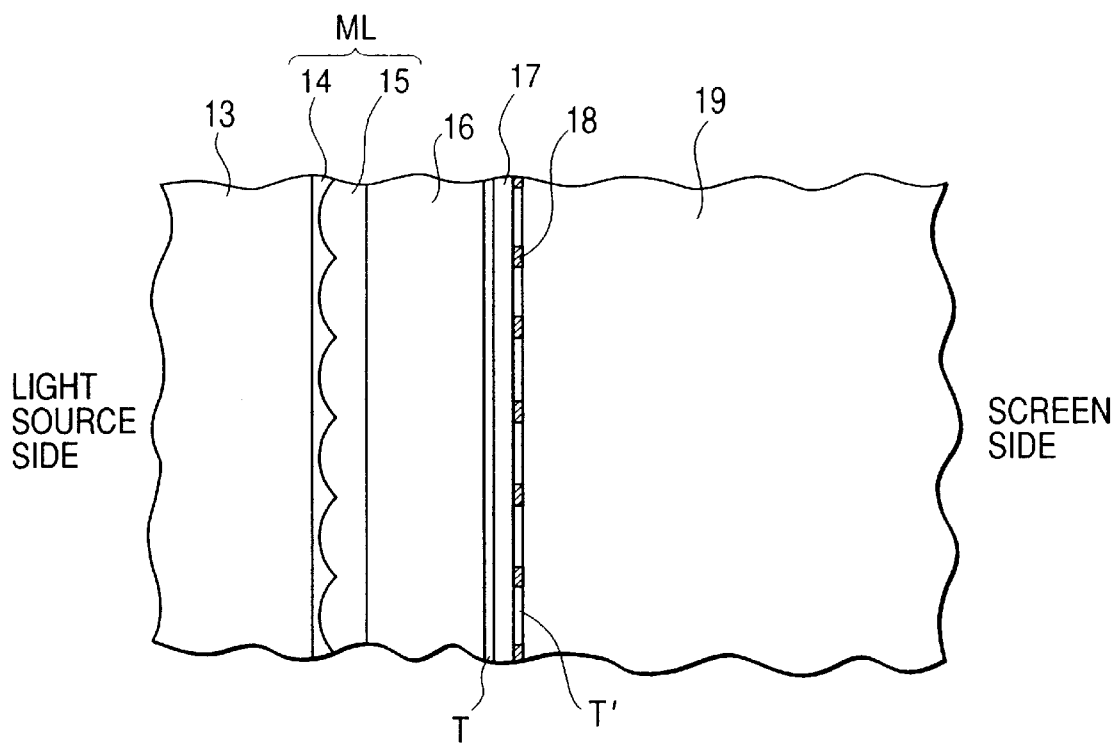
FIG. 4 is a cross-sectional view of Numerical Example 1 of the image modulating device according to the present invention.

Next described is an example of the image display device used in the projection type display apparatus of the present invention. FIG. 4 is a detailed figure of the display part 8 of this image display device.

In FIG. 4, two layers, i.e., a low-index layer 14 and a high-index layer 15, are stacked on a glass substrate 13 on the light entrance side to constitute a microlens array ML, and a glass cover 16 is bonded to the layer 15 with an adhesive (not illustrated).

A modification of the microlens array of FIG. 4 is a microlens array ML produced by making microlenses (14) in the concave shape and of a material of a low refractive index on the glass substrate 13 and bonding the glass cover 16 to the microlenses with an adhesive layer (15) of a high refractive index.

A liquid crystal layer 17 is interposed between the glass cover 16 and a glass substrate 19 on the light exit side. A transparent, common electrode layer T is placed between the liquid crystal layer 17 and the glass cover 16. T' represents transparent pixel electrodes, and shield portions 18 are portions in which circuits etc. for driving the liquid crystal are formed. The microlens array ML is an array of convex lenses. Since spherical aberration is smaller and light collection efficiency is higher in the case of the convex shape on the light source side (light entrance side) than in the opposite case, the convex lens array used herein is the one in which the convex lenses are convex on the light source side.

Figure 5:
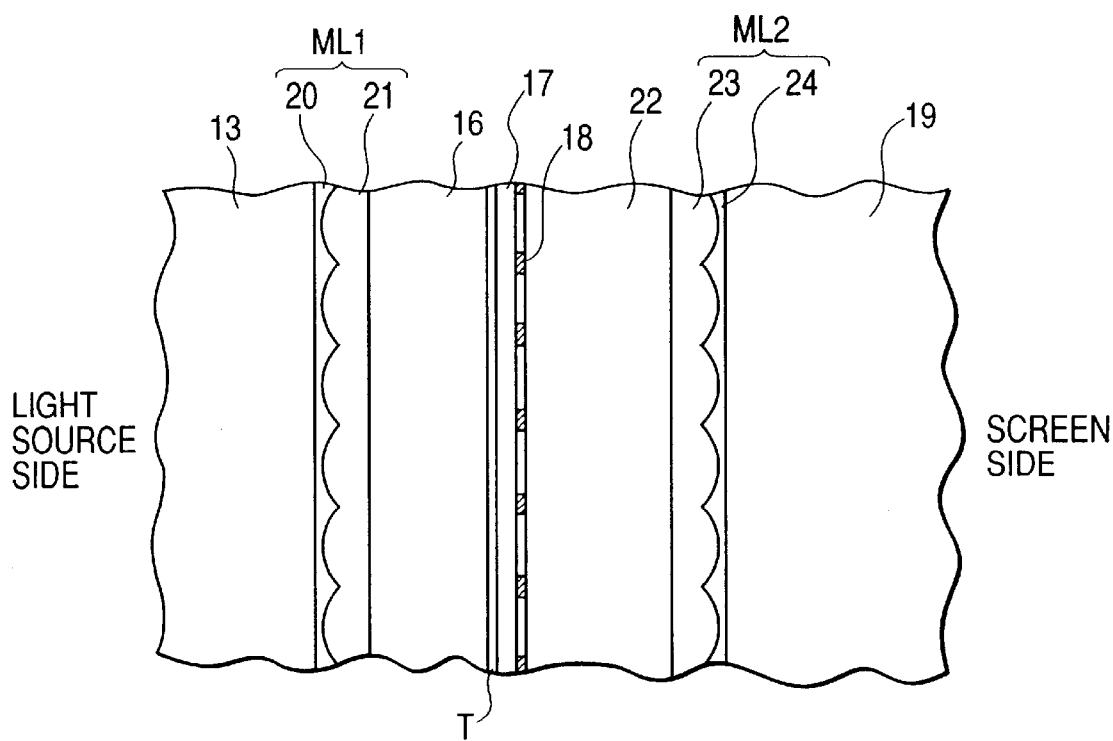
FIG. 5 is a cross-sectional view of Numerical Example 3 of the image modulating device according to the present invention.

FIG. 5 is a detailed diagram of the display part 8 in another example of the image display device used in the projection type display apparatus of the present invention. In FIG. 5, a plurality of layers, i.e., a low-index layer 20 and a high-index layer 21, are stacked on the glass substrate 13 to constitute a microlens array ML1, and the glass cover 16 is bonded to the layer 21 with an adhesive (not illustrated).

The microlens array ML1 may also be produced by making microlenses (20) in the concave shape and of a material of a low refractive index on the glass substrate 13 and bonding the glass cover 16 to the microlenses with an adhesive layer (21) of a high refractive index.

Further, two layers, i.e., a low-index layer 24 and a high-index layer 23, are stacked on the glass substrate 19 to constitute a microlens array ML2, and a glass cover 22 is bonded to the layer 23 with an adhesive.

The liquid crystal layer 17 is interposed between the glass cover 16 and the glass cover 22. The transparent, common electrode T is placed between the liquid crystal layer 17 and the glass cover 16. T' represents the transparent pixel electrodes, and the shield portions 18 compose the circuits etc. for driving the liquid crystal. Since the spherical aberration is smaller and the illumination efficiency is higher in the case of the convex shape of the microlens array ML1 on the light source side than in the opposite case, the microlens array ML1 on the light source side herein is an array of convex lenses which are convex on the light source side. Since the spherical aberration is smaller and the illumination efficiency is higher in the case of the convex shape of the microlens array ML2 on the screen side than in the opposite case, the microlens array ML2 on the screen side herein is an array of convex lenses which are convex on the screen side.

As described above, the light collection property of the illumination light onto the projection lens is enhanced by placing the microlens arrays ML1, ML2 on the both sides of the liquid crystal layer 17, whereby the illumination efficiency is increased further.

Figure 6:
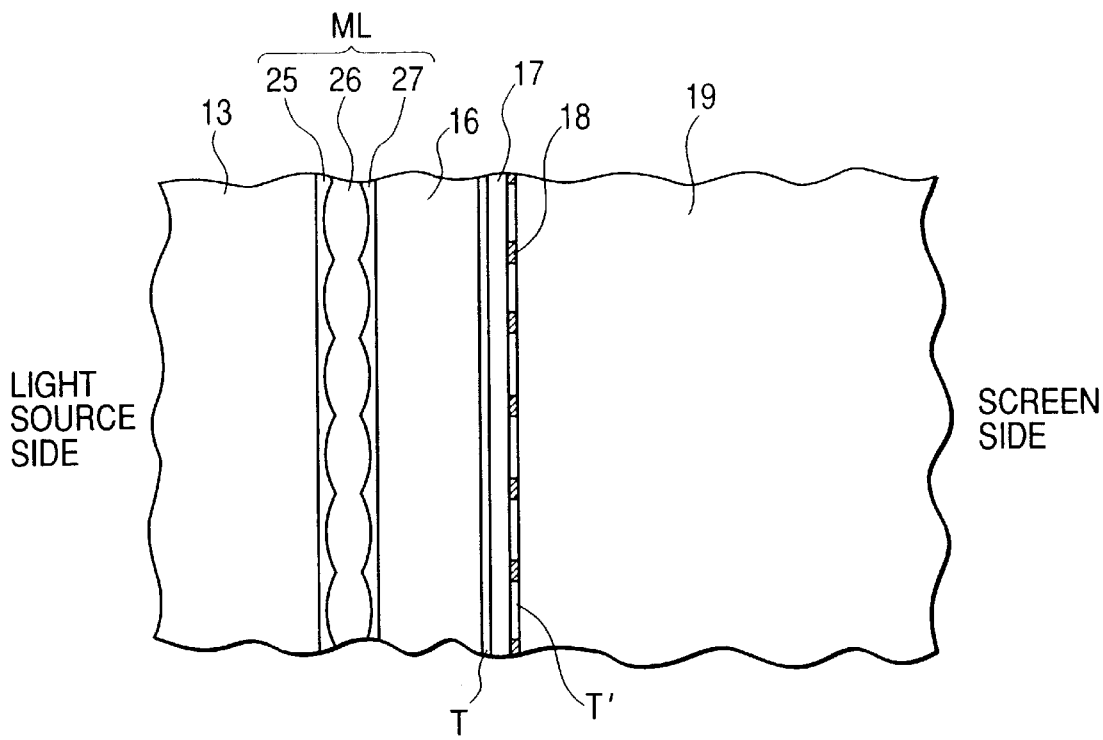
FIG. 6 is a cross-sectional view of Numerical Example 4 of the image modulating device according to the present invention.

FIG. 6 is a detailed diagram of the display part 8 in another example of the image display device used in the projection type display apparatus of the present invention.

In FIG. 6 three layers, i.e., low-index layers 25 and 27 and a high-index layer 26, are stacked on the glass substrate 13 to compose a microlens array ML and the glass cover 16 is bonded to the layer 27 with an adhesive. The liquid crystal layer 17 is interposed between the glass cover 16 and the glass substrate 19.

The transparent, common electrode layer T is placed between the liquid crystal layer 17 and the glass cover 16. T' represents the transparent pixel electrodes, and the shield portions 18 constitute the circuits etc. for driving the liquid crystal. In this example the microlenses ML are formed in the double-convex shape to increase the radius of curvature of the spherical surfaces of the microlenses and make the depth of the spherical surfaces of the microlenses shallower, thereby facilitating the production thereof. This microlens array can yield a great refracting power even in the combination of the layers having a small index difference.

Figure 7:
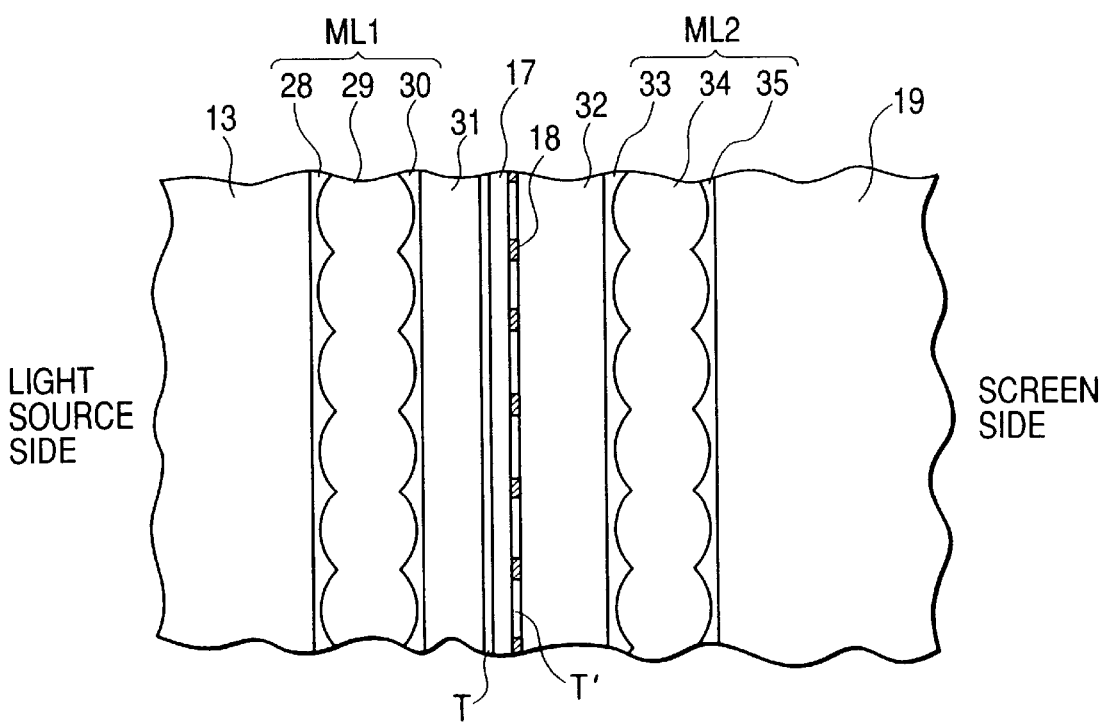
FIG. 7 is a cross-sectional view of Numerical Example 5 of the image modulating device according to the present invention.

FIG. 7 is a detailed diagram of the display part 8 of the image display device used in the projection type display apparatus of the present invention.

As illustrated in FIG. 7, three layers, i.e., low-index layers 28 and 30 and a high-index layer 29, are stacked on the glass substrate 13 to compose the microlens array ML1, and the glass cover 31 is bonded to the layer 29 with an adhesive.

Further, three layers, i.e., low-index layers 33 and 35 and a high-index layer 34, are stacked on the glass substrate 19 to compose the microlens array ML2, and the glass cover 32 is bonded to the layer 33 with an adhesive. The liquid crystal layer 17 is interposed between the glass cover 31 and the glass cover 32.

The transparent, common electrode layer T is placed between the liquid crystal layer 17 and the glass cover 31. T' represents the transparent pixel electrodes. The shield portions 18 constitute the circuits etc. for driving the liquid crystal. In this example the microlenses are also formed in the double-convex shape, so as to increase the radius of curvature of the spherical surfaces of the microlenses and make the depth of the spherical surfaces of the microlenses shallower, thereby facilitating the production of the microlenses. The microlenses can yield a great refracting power even in the combination of the layers having a small index difference.

Figure 8:
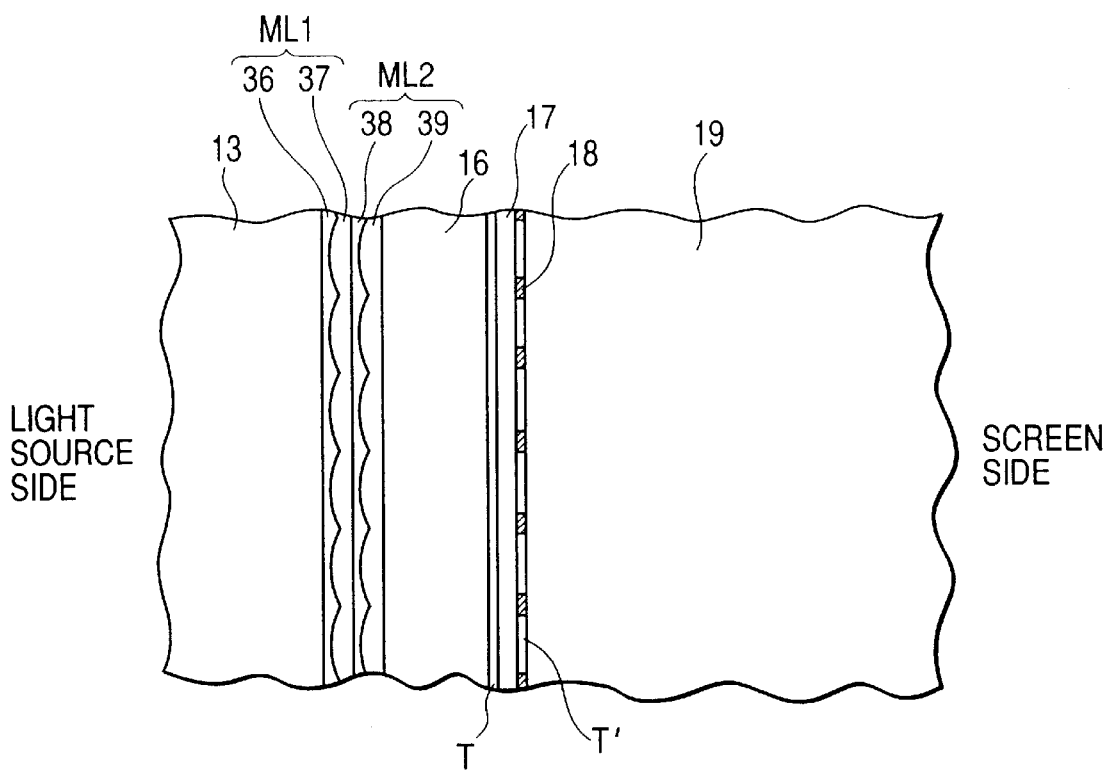
FIG. 8 is a cross-sectional view of Numerical Example 6 of the image modulating device according to the present invention.

FIG. 8 is a detailed diagram of the display part 8 of the image display device used in the projection type display apparatus of the present invention. Four layers, low-index layers 36, 38 and high-index layers 37, 39, are stacked on the glass substrate 13 to constitute a microlens array consisting of two microlens arrays ML1, ML2 superimposed along the optical path, and the glass cover 16 is further bonded to the layer 39.

The liquid crystal layer 17 is interposed between the glass cover 16 and the glass substrate 19. The transparent, common electrode layer T is placed between the liquid crystal layer 17 and the glass cover 16. T' represents the transparent pixel electrodes, and the shield portions 18 constitute the circuits etc. for driving the liquid crystal. Since the superimposed structure of the two microlens arrays permits the radius of curvature of the spherical surfaces of the microlenses ML1, ML2 to be set large, the depth of the spherical surfaces of the microlenses can be made shallower. This facilitates the production of each microlens array and the microlenses can yield a great refracting power even in the combination of the layers having a small index difference.

In this example, in order to decrease the spherical aberration, the microlenses ML1, ML2 are also formed in the plano-convex shape which is convex on the light source side.

Figure 9:
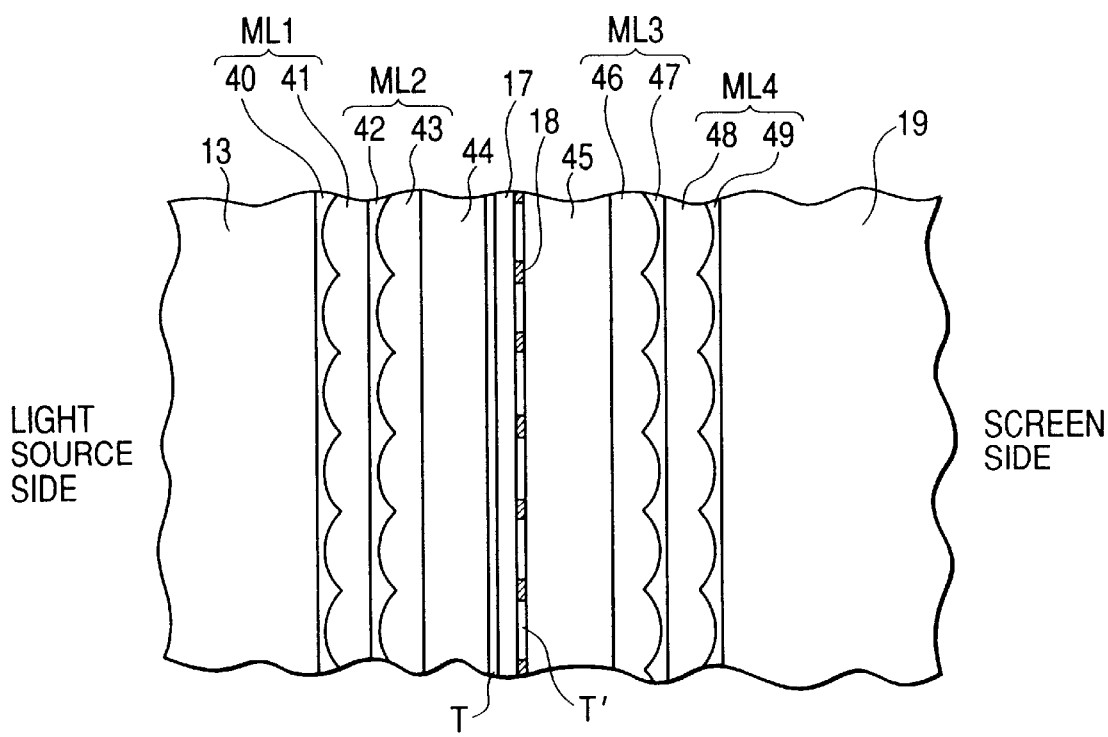
FIG. 9 is a cross-sectional view of Numerical Example 7 of the image modulating device according to the present invention.
Figure 10:
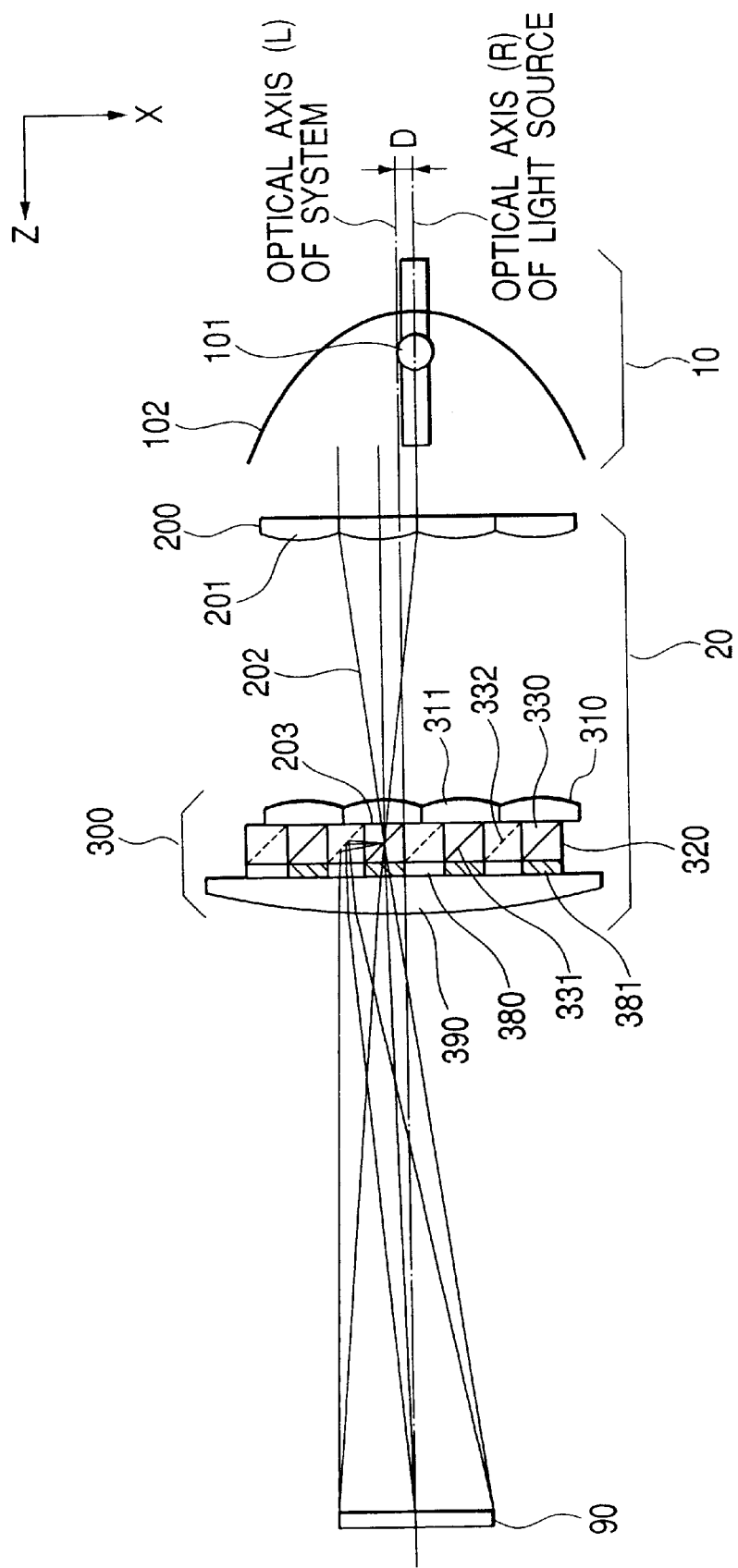
FIG. 10 is a schematic diagram to show the major part of the conventional projection type display apparatus.

FIG. 9 is a detailed diagram of the display part 8 of the image display device used in the projection type display apparatus of the present invention. Four layers, i.e., low-index layers 40, 42 and high-index layers 41, 43, are stacked on the glass substrate 13 to constitute two microlens arrays ML1, ML2, and a glass cover 44 is bonded to the layer 43 with an adhesive. Further, four layers, i.e., low-index layers 47, 49 and high-index layers 46, 48, are stacked on the glass substrate 19 to constitute microlens arrays ML3, ML4, and a glass cover 45 is bonded to the layer 46 with an adhesive.

The liquid crystal layer 17 is interposed between the glass cover 44 and the glass cover 45. The transparent, common electrode layer T is placed between the liquid crystal layer 17 and the glass cover 44. T' represents the transparent pixel electrodes, and the shield portions 18 constitute the circuits etc. for driving the liquid crystal. In the present embodiment the superimposed structure of the two microlens arrays permits the radius of curvature of the spherical surfaces of the microlenses to be set large, whereby the depth of the spherical surfaces of the microlenses can be made shallower. This facilitates the production of the microlenses and the microlenses can yield a great refracting power even in the combination of the layers having a small index difference.

In this example the microlenses ML1, ML2 on the light source side are also formed in the plano-convex shape convex on the light source side in order to decrease the spherical aberration, and the microlenses ML3, ML4 on the screen side are also formed in the plano-convex shape convex on the screen side in order to decrease the spherical aberration.

In each of the embodiments described above, the number of microlens arrays on either side of the liquid crystal layer was at most two, but the number of microlens arrays provided on the light source side of the liquid crystal layer and the number of microlens arrays provided on the screen side of the liquid layer are arbitrary.

The projection type display apparatus described above are constructed so as to satisfy each condition described in the section of SUMMARY OF THE INVENTION.

Described next are the conditions stated in the section of SUMMARY OF THE INVENTION and technical meanings thereof.

Condition (1) defines a ratio of the size of the light source images on the second lens array 4 to half of the longitudinal length of each lens of the second lens array 4. In the range not less than the upper limit the illumination efficiency is low because of a large eclipse due to the polarization converting elements, and in the range not more than the lower limit the focal length of the parabolic mirror needs to be increased and it increases the size of the parabolic mirror. Therefore, the ranges off the above condition are undesirable.

Condition (2) defines a ratio of the size of the illumination area at the display part 8 to the diagonal length of the display part 8 of the image display device. In the range not less than the upper limit the illumination efficiency is low because of increase of waste light illuminating the outside of the effective size, and in the range not more than the lower limit an eclipse appears on the screen 8. Therefore, the ranges off the above condition are undesirable.

Condition (3) defines a ratio of the focal lengths of the first condenser lens 6 and the second condenser lens 7. In the range not less than the upper limit the focal length of the second condenser lens 7 is too short, so that telecentricity becomes poor in the color combining prism 9 to cause chromatic nonuniformity. In the range not more than the lower limit the focal length of the second condenser lens 7 is too long, so that the illumination light incident to the entrance pupil of the projection lens 10 is decreased, so as to lower the illumination efficiency. Therefore, the ranges off the above conditions are undesirable.

Condition (4) defines the size of the light source images formed on the display part 8 of the image display device by the microlenses ML and the longitudinal aperture width (along the long side) of the pixels in the display part 8 of the image display device. In the range not less than the upper limit the light source images formed by the microlenses ML become larger than the aperture width of the pixels of the display part 8, so as to cause a large eclipse, thereby decreasing the illumination efficiency. In the range not more than the lower limit the distance from the first condenser lens 6 to the display part 8 needs to be set larger, which increases the size of the whole apparatus. Therefore, the ranges off the above condition are undesirable.

Condition (5) defines a ratio of the focal length of the microlenses ML to an equivalent air distance from the display-side principal points of the microlenses ML to the apertures of the pixels of the display part 8 in cases wherein the microlenses ML are placed only on the light source side (light entrance side) of the display part 8 of the image display device. In the range not less than the upper limit the apertures of the pixels become too close to the principal points of the microlenses ML, so that the light collection property of the light source images becomes poor in the portions of the apertures of the pixels, thereby decreasing the illumination efficiency. In the range not more than the lower limit the focal length of the microlenses ML becomes too small, so as to improve the light collection property at the apertures of the pixels on one hand but increase the angle of divergence of beams having passed through the apertures of the pixels on the other hand, so that peripheral rays fail to enter the entrance pupil of the projection lens 10, thereby lowering the illumination efficiency. Therefore, the ranges off the above condition are undesirable.

Condition (6) defines a ratio of the F-number on the side of the projection lens 10 to the F-number on the illumination side in cases wherein the microlenses ML are placed only on the light source 1 side of the display part 8 of the image display device. In the range not less than the upper limit the eclipse of the projection lens 10 increases, so as to lower the illumination efficiency. In the range not more than the lower limit the F-number of the projection lens 10 needs to be set brighter than necessary, so as to make designing difficult and increase the size of the projection lens 10. Therefore, the ranges off the above condition are undesirable.

Condition (7) defines a ratio of the F-number on the projection lens 10 side to the F-number of the microlenses ML in cases wherein the microlenses ML are placed only on the light source 1 side of the display part 8 of the image display device. In the range not less than the upper limit the eclipse of the projection lens 10 increases, so as to lower the illumination efficiency. In the range not more than the lower limit the F-number of the projection lens 10 needs to be set brighter than necessary, so as to make designing difficult and increase the size of the projection lens 10. Therefore, the ranges off the above condition are undesirable.

Each of Conditions (8), (9) defines a ratio of the focal length of the microlenses ML to the equivalent air distance from the display-part-8-side principal points of the microlenses ML to the apertures of the pixels of the display part 8 in cases wherein the microlenses ML are placed on the both side (on the light entrance side and on the light exit side, of the display part of the image display device. In the range not less than the upper limit the principal points of the microlenses ML become too close to the apertures of the pixels, so as to degrade the light collection property of the light source images at the aperture portions, thereby lowering the illumination efficiency. In the range not more than the lower limit the focal length of the microlenses ML becomes too small, so as to improve the light collection property at the pixel apertures on one hand but increase the angle of divergence of the beams having passed through the pixel apertures on the other hand, so that the peripheral rays fail to enter the entrance pupil of the projection lens 10, thus lowering the illumination efficiency. Therefore, the ranges off the above condition are undesirable.

Condition (10) defines a ratio of the F-number on the projection lens 10 side to the F-number on the illumination side in cases wherein the microlenses ML are placed on the both sides of the display part 8 of the image display device. In the range not less than the upper limit the eclipse of the projection lens 10 increases, so as to lower the illumination efficiency. In the range not more than the lower limit the F-number of the projection lens 10 needs to be set brighter than necessary, so as to make designing difficult and increase the size of the projection lens 10. Therefore, the ranges off the above condition are undesirable.

Each of Conditions (11), (12) defines a ratio of the F-number on the projection lens side to the F-number of the microlenses ML in cases wherein the microlenses ML are placed on the both sides of the display part 8 of the image display device. In the range not less than the upper limit the eclipse of the projection lens 10 increases, so as to lower the illumination efficiency. In the range not more than the lower limit the F-number of the projection lens 10 needs to be set brighter than necessary, so as to make designing difficult and increase the size of the projection lens 10. Therefore, the ranges off the above conditions are undesirable.

When the microlenses ML are present only on the light source side, unless the index difference is not less than 0.1 between the high-index layer and the low-index layer, the lens shape of the microlenses ML of the image display part 8 will be over semispheres and the desired light collection effect will not be achieved. In that case an increase will not be expected in the illumination efficiency. When the microlenses ML are present on the light source 1 side and on the screen S side, unless the index difference is not less than 0.2 between the high-index layer and the low-index layer, the lens shape of the microlenses ML of the image display part 8 will be over the semisphere and the desired light collection effect will not be achieved. Therefore, an increase will not be expected in the illumination efficiency.

In the projection type display apparatus of the present invention the predetermined effect can be achieved if the apparatus is constructed so as to satisfy at least one of the above conditions described above. When the apparatus satisfies two or more conditions, any combination of conditions can be adopted.

In the foregoing embodiments, the cross dichroic prism as the color combining means may be replaced with a plurality of dichroic mirrors which are parallelly arranged and used as the color separating means, a dichroic prism in which a plurality of prisms are combined as disclosed in Japanese Patent No. 2505758, or the like.

Numerical examples will be presented below. The optical systems of the examples are those illustrated in FIG. 1 to FIG. 3. For the optical system of Numerical Example 1 described below, the shape of the microlenses is optimized so as to be used in any combination with either of the microlens-integrated liquid crystal panels illustrated in FIG. 4 to FIG. 9. The optical system of Numerical Example 2 is designed to gain good illumination efficiency in the combination with the display part described as a modification of the structure of FIG. 4.

Ri indicates the radius of curvature of the i-th surface from the side of the light source 1, Di a surface separation between the i-th surface and the (i+1)th surface from the side of the light source 1, Ni the refractive index of the i-th optical element from the light source side, and K a conical constant of an aspherical surface. K1 to K12 represent values of the respective conditions described above.

[Numerical Example 1]

| | | | |
|---|---|---|---|
| R1: 14 | D1: 51.03 | N1: 1 | (parabolic surface) effective diameter φ 76 (first lens array) |
| R2: ∞ | D2: 2.5 | N2: 1.51633 | |
| R3: −25.042 | D3: 48.5 | N3: 1 | effective size 67 × 67 |
| R4: 25.042 | D4: 2.5 | N4: 1.51633 | (second lens array) |
| R5: ∞ | D5: 2 | N5: 1 | effective size 67 × 67 |
| R6: ∞ | D6: 8.375 | N6: 1.51633 | (polarization converting elements) |
| R7: ∞ | D7: 2 | N7: 1 | effective size 67 × 67 |
| R8: ∞ | D8: 9 | N8: 1.51633 | (first condenser) |
| R9: −90 | D9: 153.9 | N9: 1 | effective diameter φ 76 |
| R10: 70 | D10: 4 | N10: 1.51633 | (second condenser) |
| R11: ∞ | D11: 12 | N11: 1 | effective diameter φ 40 |
| R12: ∞ | D12: 2 | N12: 1.51633 | (LC panel) |
| R13: ∞ | D13: 15.193 | N13: 1 | effective size 9.93 × 13.22 |
| R14: ∞ | D14: 45 | N14: 1.51633 | (cross dichroic P) |
| R15: ∞ | D15: 5 | N15: 1 | effective size 45 × 45 (projection lens) |
| R16: 264.695 | D16: 8.65 | N16: 1.65844 | |
| R17: −106.584 | D17: 3.05 | N17: 1 | effective diameter φ 60 |
| R18: 138.408 | D18: 4.6 | N18: 1.65844 | |
| R19: 1068.057 | D19: 0.25 | N19: 1 | effective diameter φ 58 |
| R20: 60.708 | D20: 2.6 | N20: 1.80518 | |
| R21: 28.685 | D21: 13.95 | N21: 1.6968 | |
| R22: 284.615 | D22: 12.06 | N22: 1 | effective diameter φ 54 |
| R23: −65.494 | D23: 3.2 | N23: 1.80518 | |
| R24: −54.398 | D24: 2 | N24: 1.48749 | |
| R25: 54.398 | D25: 19.93 | N25: 1 | effective diameter φ 36 |
| R26: 131.053 | D26: 2 | N26: 1.84666 | |
| R27: 43.472 | D27: 8.7 | N27: 1.7725 | |
| R28: −148.475 | D 28: 12 | N28: 1 | effective diameter φ 40 |
| R29: 267.434 | D29: 5.45 | N29: 1.834 | |
| R30: −127.654 | D30: 16.6 | N30: 1 | effective diameter φ 44 |
| R31: −309.936 | D31: 4.2 | N31: 1.7725 | |

-continued

[Numerical Example 1]

| | | | |
|---|---|---|---|
| R32: −88.26 | D32: 9.41 | N32: 1 | effective diameter φ 47 |
| R33: −59.195 | D33: 2.5 | N33: 1.51633 | |
| R34: 59.196 | D34: 15.06 | N34: 1 | effective diameter φ 49 |
| R35: −39.464 | D35: 3.1 | N35: 1.51633 | |
| R36: −142.765 | D36: 0.4 | N36: 1 | effective diameter φ 61 |
| R37: 328.961 | D37: 7.6 | N37: 1.65844 | |
| R38: −181.319 | | | effective diameter φ 73 | aspherical coefficient R1: K=−1 length of light-emitting part of light source along optical axis direction: Larc=1.4 mm size of each lens of first lens array: 6.7×8.375 (transverse×longitudinal); the number of lenses:10×8 size of each lens of second lens array: 6.7×8.375 (transverse×longitudinal); the number of lenses:10×8 pitch of prisms of polarization converting element array: 4.1875

K1=1.158

K2=1.013

K3=1.286

K4=0.963 (in combination with the microlens-integrated liquid crystal panel of FIG. 4)

K5=3.143 (in combination with the microlens-integrated liquid crystal panel of FIG. 4)

K6=0.903 (in combination with the microlens-integrated liquid crystal panel of FIG. 4)

K7=0.546 (in combination with the microlens-integrated liquid crystal panel of FIG. 4)

K4=0.971 (in combination with the microlens-integrated liquid crystal panel of FIG. 6)

K5=2.687 (in combination with the microlens-integrated liquid crystal panel of FIG. 6)

K6=0.903 (in combination with the microlens-integrated liquid crystal panel of FIG. 6)

K7=0.632 (in combination with the microlens-integrated liquid crystal panel of FIG. 6)

K4=0.888 (in combination with the microlens-integrated liquid crystal panel of FIG. 8)

K5=2.919 (in combination with the microlens-integrated liquid crystal panel of FIG. 8)

K6=0.903 (in combination with the microlens-integrated liquid crystal panel of FIG. 8)

K7=0.638 (in combination with the microlens-integrated liquid crystal panel of FIG. 8)

K8=1.888 (in combination with the microlens-integrated liquid crystal panel of FIG. 5)

K9=1.878 (in combination with the microlens-integrated liquid crystal panel of FIG. 5)

K10=0.903 (in combination with the microlens-integrated liquid crystal panel of FIG. 5)

K11=0.909 (in combination with the microlens-integrated liquid crystal panel of FIG. 5)

K12=0.909 (in combination with the microlens-integrated liquid crystal panel of FIG. 5)

K8=2.148 (in combination with the microlens-integrated liquid crystal panel of FIG. 7)

K9=2.148 (in combination with the microlens-integrated liquid crystal panel of FIG. 7)

K10=0.903 (in combination with the microlens-integrated liquid crystal panel of FIG. 7)

K11=1.012 (in combination with the microlens-integrated liquid crystal panel of FIG. 7)

K12=1.012 (in combination with the microlens-integrated liquid crystal panel of FIG. 7)

K8=1.897 (in combination with the microlens-integrated liquid crystal panel of FIG. 9)

K9=1.899 (in combination with the microlens-integrated liquid crystal panel of FIG. 9)

K10=0.903 (in combination with the microlens-integrated liquid crystal panel of FIG. 9)

K11=1.045 (in combination with the microlens-integrated liquid crystal panel of FIG. 9)

K12=1.045 (in combination with the microlens-integrated liquid crystal panel of FIG. 9)

[Numerical Example 1 (B-ch optical path)]

| | | | |
|---|---|---|---|
| R1: 14 | D1: 51.03 | N1: 1 | (parabolic surface) effective diameter φ 76 |
| R2: ∞ | D2: 2.5 | N2: 1.51633 | (first lens array) |
| R3: −25.042 | D3: 48.5 | N3: 1 | effective size 67 × 67 |
| R4: 25.042 | D4: 2.5 | N4: 1.51633 | (second lens array) |
| R5: ∞ | D5: 2 | N5: 1 | effective size 67 × 67 |
| R6: ∞ | D6: 8.375 | N6: 1.51633 | (polarization converting elements) |
| R7: ∞ | D7: 2 | N7: 1 | effective size 67 × 67 |
| R8: ∞ | D8: 9 | N8: 1.51633 | (first condenser) |
| R9: −90 | D9: 153.9 | N9: 1 | effective diameter φ 76 |
| R10: 60 | D10: 8 | N10: 1.51633 | (condenser) |
| R11: −60 | D11: 88.28 | N11: 1 | effective diameter φ 60 |
| R12: 50 | D12: 10 | N12: 1.51633 | (relay) |
| R13: −50 | D13: 88.28 | N13: 1 | effective diameter φ 60 |
| R14: 70 | D10: 4 | N10: 1.51633 | (second condenser) |
| R15: ∞ | D11: 12 | N11: 1 | effective diameter φ 40 |
| R16: ∞ | D12: 2 | N12: 1.51633 | (LC panel) |
| R17: ∞ | D13: 15.193 | N13: 1 | effective size 9.93 × 13.22 |
| R18: ∞ | D14: 45 | N14: 1.51633 | (cross dichroic P) |
| R19: ∞ | D15: 5 | N15: 1 | effective size 45 × 45 |
| R20: 264.695 | D16: 8.65 | N16: 1.65844 | (projection lens) |
| R21: −106.584 | D17: 3.05 | N17: 1 | effective diameter φ 60 |
| R22: 138.408 | D18: 4.6 | N18: 1.65844 | |
| R23: 1068.057 | D19: 0.25 | N19: 1 | effective diameter φ 58 |
| R24: 60.708 | D20: 2.6 | N20: 1.80518 | |
| R25: 28.685 | D21: 13.95 | N21: 1.6968 | |
| R26: 284.615 | D22: 12.06 | N22: 1 | effective diameter φ 54 |
| R27: −65.494 | D23: 3.2 | N23: 1.80518 | |
| R28: −54.398 | D24: 2 | N24: 1.48749 | |
| R29: 54.398 | D25: 19.93 | N25: 1 | effective diameter φ 36 |
| R30: 131.053 | D26: 2 | N26: 1.84666 | |
| R31: 43.472 | D27: 8.7 | N27: 1.7725 | |
| R32: −148.475 | D28: 12 | N28: 1 | effective diameter φ 40 |
| R33: 267.434 | D29: 5.45 | N29: 1.834 | |
| R34: −127.654 | D30: 16.6 | N30: 1 | effective diameter φ 44 |
| R35: −309.936 | D31: 4.2 | N31: 1.7725 | |
| R36: −88.26 | D32: 9.41 | N32: 1 | effective diameter φ 47 |
| R37: −59.195 | D33: 2.5 | N33: 1.51633 | |
| R38: 59.196 | D34: 15.06 | N34: 1 | effective diameter φ 49 |
| R39: −39.464 | D35: 3.1 | N35: 1.51633 | |
| R40: −142.765 | D36: 0.4 | N36: 1 | effective diameter φ 61 |
| R41: 328.961 | D37: 7.6 | N37: 1.65844 | |
| R42: −181.319 | | | effective diameter φ 73 | aspherical coefficients R1:K=−1 R12:K=2.3 R13:K=−2.3

[Numerical Example 2]

| | | | |
|---|---|---|---|
| R1: 14 | D1: 51.03 | N1: 1 | (parabolic surface) effective diameter φ 76 |
| R2: ∞ | D2: 2.5 | N2: 1.51633 | (first lens array) |
| R3: −25.042 | D3: 48.5 | N3: 1 | effective size 67 × 67 |
| R4: 25.042 | D4: 2.5 | N4: 1.51633 | (second lens array) |
| R5: ∞ | D5: 2 | N5: 1 | effective size 67 × 67 |
| R6: ∞ | D6: 8.375 | N6: 1.51633 | (polarization converting elements) |
| R7: ∞ | D7: 2 | N7: 1 | effective size 67 × 67 |
| R8: ∞ | D8: 11 | N8: 1.51633 | (first condenser) |
| R9: −60.162 | D9: 104 | N9: 1 | effective diameter φ 76 |
| R10: 58.492 | D10: 4 | N10: 1.51633 | (second condenser) |
| R11: ∞ | D11: 12 | N11: 1 | effective diameter φ 40 |
| R12: ∞ | D12: 2 | N12: 1.51633 | (LC panel) |
| R13: ∞ | D13: 15.193 | N13: 1 | effective size 6.86 × 9.14 |
| R14: ∞ | D14: 45 | N14: 1.51633 | (cross dichroic P) |
| R15: ∞ | D15: 5 | N15: 1 | effective size 45 × 45 |
| R16: 264.695 | D16: 8.65 | N16: 1.65844 | (projection lens) |
| R17: −106.584 | D17: 3.05 | N17: 1 | effective diameter φ 60 |
| R18: 138.408 | D18: 4.6 | N18: 1.65844 | |
| R19: 1068.057 | D19: 0.25 | N19: 1 | effective diameter φ 58 |
| R20: 60.708 | D20: 2.6 | N20: 1.80518 | |
| R21: 28.685 | D21: 13.95 | N21: 1.6968 | |
| R22: 284.615 | D22: 12.06 | N22: 1 | effective diameter φ 54 |
| R23: −65.494 | D23: 3.2 | N23: 1.80518 | |
| R24: −54.398 | D24: 2 | N24: 1.48749 | |
| R25: 54.398 | D25: 19.93 | N25: 1 | effective diameter φ 36 |
| R26: 131.053 | D26: 2 | N26: 1.84666 | |
| R27: 43.472 | D27: 8.7 | N27: 1.7725 | |
| R28: −148.475 | D28: 12 | N28: 1 | effective diameter φ 40 |
| R29: 267.434 | D29: 5.45 | N29: 1.834 | |
| R30: −127.654 | D30: 16.6 | N30: 1 | effective diameter φ 44 |
| R31: −309.936 | D31: 4.2 | N31: 1.7725 | |
| R32: −88.26 | D32: 9.41 | N32: 1 | effective diameter φ 47 |
| R33: −59.195 | D33: 2.5 | N33: 1.51633 | |
| R34: 59.196 | D34: 15.06 | N34: 1 | effective diameter φ 49 |
| R35: −39.464 | D35: 3.1 | N35: 1.51633 | |
| R36: −142.765 | D36: 0.4 | N36: 1 | effective diameter φ 61 |
| R37: 328.961 | D37: 7.6 | N37: 1.65844 | |
| R38: −181.319 | | | effective diameter φ 73 | length of light-emitting part of light source along optical axis direction: Larc=1.4 mm aspherical coefficients R1:K=−1 R9:K=−2 R10:K=−2 size of each lens of first lens array: 6.7×8.375 (transverse×longitudinal); the number of lenses:10×8 size of each lens of second lens array: 6.7×8.375 (transverse×longitudinal); the number of lenses:10×8 pitch of prisms of polarization converting element array: 4.1875

K1=1.158

K2=1.015

K3=1.029

K4=1.388 (in combination with the modification of the microlens-integrated liquid crystal panel of FIG. 4)

K5=3.65 (in combination with the modification of the microlens-integrated liquid crystal panel of FIG. 4)

K6=1.303 (in combination with the modification of the microlens-integrated liquid crystal panel of FIG. 4)

K7=0.470 (in combination with the modification of the microlens-integrated liquid crystal panel of FIG. 4)

| (Example 1 of liquid crystal microlenses) | | | |
|---|---|---|---|
| R1: ∞ | D1: 1 | N1: 1.51633 | (substrate) |
| R2: ∞ | D2: 0.0026 | N2: 1.48749 | (low-index layer) |
| R3: 0.0206 | D3: 0.0142 | N3: 1.65844 | (high-index layer) |
| R4: ∞ | D4: 0.0372 | N4: 1.51633 | (glass cover) |
| R5: ∞ | D5: 0.0002 | N5: 1.79 | (transparent electrode layer) |
| R6: ∞ | D6: 0.0077 | N6: 1.5 | (liquid crystal layer) |
| R7: ∞ | D7: 1 | N7: 1.51633 | (substrate: aperture position) |
| R8: ∞ | | | | liquid crystal pitch: 0.0258 × 0.0258
aperture rate: 60%

| (Example 2 of liquid crystal microlenses) | | | |
|---|---|---|---|
| R1: ∞ | D1: 1 | N1: 1.51633 | (substrate) |
| R2: ∞ | D2: 0.0026 | N2: 1.48749 | (low-index layer) |
| R3: 0.0239 | D3: 0.0142 | N3: 1.65844 | (high-index layer) |
| R4: ∞ | D4: 0.0372 | N4: 1.51633 | (glass cover) |
| R5: ∞ | D5: 0.0002 | N5: 1.79 | (transparent electrode layer) |
| R6: ∞ | D6: 0.0077 | N6: 1.5 | (liquid crystal layer) |
| R7: ∞ | D7: 1 | N7: 1.51633 | (substrate: aperture position) |
| R8: ∞ | | | | liquid crystal pitch: 0.0258 × 0.0258
aperture rate: 60%

| (Example 3 of liquid crystal microlenses) | | | |
|---|---|---|---|
| R1: ∞ | D1: 1 | N1: 1.51633 | (substrate) |
| R2: ∞ | D2: 0.0026 | N2: 1.48749 | (low-index layer) |
| R3: 0.0206 | D3: 0.0142 | N3: 1.7725 | (high-index layer) |
| R4: ∞ | D4: 0.038 | N4: 1.51633 | (glass cover) |
| R5: ∞ | D5: 0.0002 | N5: 1.79 | (transparent electrode layer) |
| R6: ∞ | D6: 0.0077 | N6: 1.5 | (liquid crystal) |
| R7: ∞ | D7: 0.0459 | N7: 1.51633 | (glass cover) (aperture position) |
| R8: ∞ | D8: 0.0142 | N8: 1.7725 | (high-index layer) |
| R8: −0.0206 | D8: 0.0026 | N8: 1.48749 | (low-index layer) |
| R9: ∞ | D9: 1 | N9: 1.51633 | (substrate) |
| R10: ∞ | | | | liquid crystal pitch: 0.0258 × 0.0258
aperture rate: 60%

| (Example 4 of liquid crystal microlenses) | | | |
|---|---|---|---|
| R1: ∞ | D1: 1 | N1: 1.51633 | (substrate) |
| R2: ∞ | D2: 0.0026 | N2: 1.48749 | (low-index layer) |
| R3: 0.0348 | D3: 0.0142 | N3: 1.65844 | (high-index layer) |
| R4: −0.0348 | D4: 0.0026 | N4: 1.48749 | (low-index layer) |
| R5: ∞ | D5: 0.0346 | N5: 1.51633 | (glass cover) |
| R6: ∞ | D6: 0.0002 | N6: 1.79 | (transparent electrode layer) |
| R7: ∞ | D7: 0.0077 | N7: 1.5 | (liquid crystal) |
| R8: ∞ | D8: 1 | N8: 1.51633 | (substrate: aperture position) |
| R9: ∞ | | | | liquid crystal pitch: 0.0258 × 0.0258
aperture rate: 60%

| (Example 5 of liquid crystal microlenses) | | | |
|---|---|---|---|
| R1: ∞ | D1: 1 | N1: 1.51633 | (substrate) |
| R2: ∞ | D2: 0.0026 | N2: 1.48749 | (low-index layer) |
| R3: 0.0206 | D3: 0.0284 | N3: 1.65844 | (high-index layer) |
| R4: −0.0206 | D4: 0.0026 | N4: 1.48749 | (low-index layer) |
| R5: ∞ | D5: 0.0212 | N5: 1.51633 | (glass cover) |
| R6: ∞ | D6: 0.0002 | N6: 1.79 | (transparent electrode layer) |
| R7: ∞ | D7: 0.0077 | N7: 1.5 | (liquid crystal) |
| R8: ∞ | D8: 0.0292 | N8: 1.51633 | (glass cover) (aperture position) |
| R9: ∞ | D9: 0.0026 | N9: 1.48749 | (low-index layer) |
| R10: 0.0206 | D10: 0.0284 | N10: 1.65844 | (high-index layer) |
| R11: −0.0206 | D11: 0.026 | N11: 1.48749 | (low-index layer) |
| R12: ∞ | D12: 1 | N12: 1.51633 | (substrate) |
| R13: ∞ | | | | liquid crystal pitch: 0.0258 × 0.0258
aperture rate: 60%

| (Example 6 of liquid crystal microlenses) | | | |
|---|---|---|---|
| R1: ∞ | D1: 1 | N1: 1.51633 | (substrate) |
| R2: ∞ | D2: 0.0026 | N2: 1.48749 | (low-index layer) |
| R3: 0.0348 | D3: 0.0071 | N3: 1.65844 | (high-index layer) |
| R4: ∞ | D4: 0.0026 | N4: 1.48749 | (low-index layer) |
| R5: 0.0348 | D5: 0.0071 | N5: 1.65844 | (high-index layer) |
| R6: ∞ | D6: 0.0346 | N6: 1.51633 | (glass cover) |
| R7: ∞ | D7: 0.0002 | N7: 1.79 | (transparent electrode layer) |
| R8: ∞ | D8: 0.0077 | N8: 1.5 | (liquid crystal) |
| R9: ∞ | D9: 1 | N9: 1.51633 | (substrate: aperture position) |
| R10: ∞ | | | | liquid crystal pitch: 0.0258 × 0.0258
aperture rate: 60%

| (Example 7 of liquid crystal microlenses) | | | |
|---|---|---|---|
| R1: ∞ | D1: 1 | N1: 1.51633 | (substrate) |
| R2: ∞ | D2: 0.0026 | N2: 1.48749 | (low-index layer) |
| R3: 0.0206 | D3: 0.0142 | N3: 1.65844 | (high-index layer) |
| R4: ∞ | D4: 0.0026 | N4: 1.48749 | (low-index layer) |
| R5: 0.0206 | D5: 0.0142 | N5: 1.65844 | (high-index layer) |
| R6: ∞ | D6: 0.0212 | N6: 1.51633 | (glass cover) |
| R7: ∞ | D7: 0.0002 | N7: 1.79 | (transparent electrode layer) |
| R8: ∞ | D8: 0.0077 | N8: 1.5 | (liquid crystal) |
| R9: ∞ | D9: 0.0212 | N9: 1.51633 | (glass cover) (aperture position) |
| R10: ∞ | D10: 0.0142 | N10: 1.65844 | (high-index layer) |
| R11: −0.0206 | D11: 0.0026 | N11: 1.48749 | (low-index layer) |
| R12: ∞ | D12: 0.0142 | N12: 1.65844 | (high-index layer) |
| R13: −0.0206 | D13: 0.0026 | N13: 1.48749 | (low-index layer) |
| R14: ∞ | D14: 1 | N12: 1.51633 | (substrate) |
| R15: ∞ | | | | liquid crystal pitch: 0.0258 × 0.0258
aperture rate: 60%

What is claimed is:

1. An illumination apparatus comprising a light-collecting reflector, a light source placed at a position of a focal point of the reflector, a first lens array for condensing light reflected by the reflector, a second lens array disposed at or near a position of a rear focal point of the first lens array, and an optical system for illuminating a surface to be illuminated, with multiple beams from the second lens array, said illumination apparatus satisfying the following condition:

$$0.7 < K1 < 1.3$$

where $K1 = (\text{Larc} \times \text{flyf1}/2\text{fm})/(\text{Lfly2p}/2)$ where Larc: a length of a light-emitting portion of said light source along a direction of the optical axis, flyf1: a focal length of said first lens array, fm: a focal length of said light-collecting reflector, and Lfly2p: a length along a longitudinal direction of an entrance surface of each lens of said second lens array.

2. An illumination apparatus comprising a first lens array for condensing light from a light source, a second lens array disposed at or near a position of a rear focal point of the first lens array, a first optical system for condensing multiple beams from the second lens array, and a second optical system for illuminating a surface to be illuminated, with said multiple beams from the first optical system, said illumination apparatus satisfying the following condition:

$$0.95 < K2 < 1.15$$

where K2=(Lfly1p×fc12/flyf2)/Ldsp
where Ldsp: a diagonal length of said surface to be illuminated,
flyf2: a focal length of said second lens array,
fc12: a composite focal length of said first lens system and said second lens system, and
Lfly1p: a diagonal length of each lens of said first lens array.

3. An illumination apparatus comprising a first lens array for condensing light from a light source, a second lens array disposed at or near a position of a rear focal point of the first lens array, a first optical system for condensing multiple beams from the second lens array, and a second optical system for illuminating a surface to be illuminated, with the multiple beams from the first optical system, said illumination apparatus satisfying the following condition:

$$0.9 < K3 < 1.4$$

where K3=fc1/fc2
where fc1: a focal length of said first optical system, and
fc2: a focal length of said second optical system.

4. An illumination apparatus comprising a first lens array for condensing light from a light source, a second lens array disposed at or near a position of a rear focal point of the first lens array, a first optical system for condensing multiple beams from the second lens array, and a second optical system for illuminating a display device with the multiple beams from the first optical system, said display device comprising a display part in which a plurality of pixels of a rectangular shape are arrayed, and a microlens array placed on the light incidence side of the display part, said illumination apparatus satisfying the following condition:

$$0.6 < K4 < 1.6$$

where K4=(Dmicro/F12c)/Lop
where F12c: a composite F-number of said first optical system and said second optical system,
Dmicro: an equivalent air distance from principal points of microlenses of said microlens array on the side of said display part, to apertures of the pixels of the display device, and
Lop: an aperture width along a longitudinal direction of the pixels of said display device.

5. An illumination apparatus comprising a first lens array for condensing light from a light source, a second lens array disposed at or near a position of a rear focal point of the first lens array, and an optical system for illuminating an image display device with multiple beams from the second lens array, said image display device comprising a display part in which a plurality of pixels are arrayed, and a microlens array placed on the light incidence side of the display part, said illumination apparatus satisfying the following condition:

$$2 < K5 < 4.5$$

where K5=fmicro/Dmicro
where Dmicro: an equivalent air distance from principal points of microlenses of said microlens array on the display part side of said display device, to apertures of the pixels of said display device, and fmicro: a focal length of the microlenses.

6. A projection type display apparatus comprising a first lens array for condensing light from a light source, a second lens array disposed at or near a position of a rear focal point of the first lens array, a first optical system for condensing multiple beams from the second lens array, a second optical system for illuminating an image display device with the multiple beams from the first optical system, said image display device comprising a display part in which a plurality of pixels are arrayed, and a microlens array placed on the light incidence side of the display part, and a projection optical system for projecting image light from the image display device, said projection type display apparatus satisfying the following condition:

$$0.6 < K6 < 1.5$$

where K6=Fpj/F12c
where F12c: a composite F-number of said first optical system and said second optical system, and
Fpj: an F-number of said projection optical system.

7. A projection type display apparatus comprising a first lens array for condensing light from a light source, a second lens array disposed at or near a position of a rear focal point of the first lens array, an optical system for condensing multiple beams from the second lens array and illuminating an image display device therewith, said image display device comprising a display part in which a plurality of pixels are arrayed, and a microlens array placed on the light incidence side of the display part, and a projection optical system for projecting image light from the display device, said projection type display apparatus satisfying the following condition:

$$0.35 < K7 < 0.85$$

where K7=Fpj/Fmicro
where Fpj: an F-number of said projection optical system, and
Fmicro: an F-number of microlenses of said microlens array.

8. An illumination apparatus comprising a first lens array for condensing light from a light source, a second lens array disposed at or near a position of a rear focal point of the first lens array, and an optical system for condensing multiple beams from the second lens array and illuminating an image display device therewith, said image display device comprising a display part in which a plurality of pixels of a rectangular shape are arrayed, and microlens arrays placed on the light incidence side and on the light emergence side of the display part, said illumination apparatus satisfying the following conditions:

$$1.3 < K8 < 2.5$$
$$1.3 < K9 < 2.5$$

where K8=fmicrok/Dmicrok and
K9=fmicros/Dmicros
where fmicrok: a focal length of microlenses of said microlens array on said light incidence side,
Dmicrok: a distance between principal points on the side of said display part, of said microlenses on said light incidence side and apertures of the pixels of said display part,
fmicros: a focal length of microlenses of said microlens array on said light emergence side, and Dmicros: a distance between principal points on the side of said display part, of said microlenses on said light emergence side and the apertures of the pixels of said display part.

9. A projection type display apparatus comprising a first lens array for condensing light from a light source, a second lens array disposed at or near a position of a focal point of the first lens array, a first optical system for condensing multiple beams from the second lens array, a second optical system for illuminating an image display device with the multiple beams from the first optical system, said image display device comprising a display part in which a plurality of pixels are arrayed, and a projection optical system for projecting image light from the image display device, said projection type display apparatus satisfying the following condition:

$$0.6 < K10 < 1.6$$

where K10=Fpj/F12c where F12c: a composite F-number of said first optical system and said second optical system, and Fpj: an F-number of said projection optical system.

10. A projection type display apparatus comprising a first lens array for condensing light from a light source, a second lens array disposed at or near a position of a rear focal point of the first lens array, an optical system for condensing multiple beams from the second lens array and illuminating an image display device therewith, said image display device comprising a display part in which a plurality of pixels are arrayed, and microlens arrays placed on the light incidence side and on the light emergence side of the display part, and a projection optical system for projecting image light from the image display device, said projection type display apparatus satisfying the following conditions:

$$0.7 < K11 < 1.2$$
$$0.7 < K12 < 1.2$$

where K11=Fpj/Fmicrok and
K12=Fpj/Fmicros
where Fpj: an F-number of said projection optical system,
Fmicrok: an F-number of microlenses of said microlens array on said light incidence side, and
Fmicros: an F-number of microlenses of said microlens array on said light emergence side.

11. The illumination apparatus according to either one of claims 1 to 5, and 8, wherein a polarization converting element is provided on the side of a light exit surface of said second lens array.

12. The projection type display apparatus according to claim 6, 7, 9, or 10, wherein a polarization converting element is provided on the side of a light exit surface of said second lens array.

13. The illumination apparatus according to claim 1, wherein said light-collecting reflector is comprised of a parabolic reflector.

14. The illumination apparatus according to either one of claims 2 to 5, and 8, wherein said light source is located at or near the focal point of the parabolic reflector and said reflector outputs nearly parallel beams.

15. The projection type display apparatus according to claim 6, 7, 9, or 10, wherein said light source is located at or near the focal point of the parabolic reflector and said reflector outputs nearly parallel beams.

16. A projection type display apparatus which projects image information from a liquid crystal panel placed at a surface to be illuminated, which is illuminated by the illumination apparatus as set forth in either one of claims 1 to 5, and 8, through a projection lens.

17. An illumination apparatus comprising a first lens array for condensing light from a light source, a second lens array disposed at or near a position of a rear focal point of the first lens array, and an optical system for illuminating an image display device with multiple beams from the second lens array, said image display device comprising a display part in which a plurality of pixels are arrayed, and a microlens array placed on the light incidence side of the display part, wherein a plurality of microlenses constituting the microlens array are comprised of a stack of plural layers, a layer having the highest refractive index out of the plural layers has a lens surface convex on the light incidence side, and an index difference between refractive indices of media on the both sides of the lens surface is not less than 0.1.

18. An illumination apparatus comprising a first lens array for condensing light from a light source, a second lens array disposed at or near a position of a rear focal point of the first lens array, and an optical system for illuminating an image display device with multiple beams from the second lens array, said image display device comprising a display part in which a plurality of pixels are arrayed, and a microlens array placed on the light incidence side of the display part, wherein each microlens constituting the microlens array comprises two or more refracting surfaces having light condensing action.

19. An illumination apparatus comprising a first lens array for condensing light from a light source, a second lens array disposed at or near a position of a rear focal point of the first lens array, and an optical system for illuminating an image display device with multiple beams from the second lens array, said image display device comprising a display part in which a plurality of pixels are arrayed, and a microlens array placed on the light incidence side of the display part, wherein said microlens array is comprised of a stack of plural layers and a layer having the highest refractive index out of the plural layers is of a double-convex shape.

20. An illumination apparatus comprising a first lens array for condensing light from a light source, a second lens array disposed at or near a position of a rear focal point of the first lens array, and an optical system for illuminating an image display device with multiple beams from the second lens array, said image display device comprising a display part in which a plurality of pixels are arrayed, and microlens arrays placed on the light incidence side and on the light emergence side of the display part, wherein a layer having the highest refractive index out of layers forming each lens of the microlens array on the light incidence side has a lens surface convex on the light incidence side and an index difference between refractive indices of media on the both sides of the lens surface of the lens is not less than 0.1 and wherein a layer having the highest refractive index out of layers forming each lens of the microlens array on the light emergence side has a lens surface convex on the light emergence side and an index difference between refractive indices of media on the both sides of the lens surface of the lens is not less than 0.2.

21. An illumination apparatus comprising a first lens array for condensing light from a light source, a second lens array disposed at or near a position of a rear focal point of the first lens array, and an optical system for illuminating an image display device with multiple beams from the second lens array, said image display device comprising a display part in which a plurality of pixels are arrayed, and microlens arrays placed on the light incidence side and on the light emergence side of the display part, wherein each of the microlens arrays is comprised of a stack of plural layers and a layer having the highest refractive index out of the plural layers is of a double-convex shape.

22. An illumination apparatus comprising a first lens array for condensing light from a light source, a second lens array disposed at or near a position of a rear focal point of the first lens array, and a lens system for illuminating an image display device with multiple beams from the second lens array, said image display device comprising a display part in which a plurality of pixels are arrayed, and microlens arrays placed on the light incidence side and on the light emergence side of the display part, wherein each lens of the microlens arrays on the light incidence side and on the light emergence side comprises two or more refracting surfaces having light condensing action.

23. The illumination apparatus according to either one of claims 18 to 22, wherein a polarization converting element is provided on the side of a light exit surface of said second lens array.

24. The illumination apparatus according to either one of claims 18 to 22, wherein said light source is located at or near the focal point of a parabolic reflector and said reflector outputs nearly parallel beams.

25. A projection type display apparatus which projects image information from a liquid crystal panel placed at a surface to be illuminated, which is illuminated by the illumination apparatus as set forth in either one of claims 18 to 22, through a projection lens.

26. An illumination apparatus comprising a first optical system for condensing light from a light source, and a second optical system for illuminating a surface to be illuminated, with beams from the first optical system, said illumination apparatus satisfying the following condition:

$$0.9 < K3 < 1.4$$

where $K3 = fc1/fc2$ where $fc1$: a focal length of said first optical system, and $fc2$: a focal length of said second optical system.

27. An illumination apparatus comprising a first optical system for condensing light from a light source, and a second optical system for condensing light from the first optical system and illuminating an image display device therewith, said image display device comprising a display part in which a plurality of pixels of a rectangular shape are arrayed, and a microlens array placed on the light incidence side of the display part, said illumination apparatus satisfying the following condition:

$$0.6 < K4 < 1.6$$

where $K4 = (Dmicro/F12c)/Lop$ where $F12c$: a composite F-number of said first optical system and said second optical system, Dmicro: an equivalent air distance from principal points on the side of said display part, of said microlens array, to apertures of the pixels of said display part, and Lop: an aperture width along a longitudinal direction of the pixels of said display part.

28. An illumination apparatus comprising an optical system for illuminating an image display device with light from a light source, said image display device comprising a display part in which a plurality of pixels are arrayed, and a microlens array placed on the light incidence side of the display part, said illumination apparatus satisfying the following condition:

$$2 < K5 < 4.5$$

where $K5 = fmicro/Dmicro$ where Dmicro: an equivalent air distance from principal points on the side of said display part, of said microlens array, to apertures of the pixels of said display part, and fmicro: a focal length of said microlens array.

29. A projection type display apparatus comprising a first optical system for condensing light from a light source, a second optical system for illuminating an image display device with beams from the first optical system, said image display device comprising a display part in which a plurality of pixels are arrayed, and a microlens array placed on the light incidence side of the display part, and a projection optical system for projecting image information from the image display device, said projection type display apparatus satisfying the following condition:

$$0.6 < K6 < 1.5$$

where $K6 = Fpj/F12c$ where F12c: a composite F-number of said first optical system and said second optical system, and Fpj: an F-number of said projection optical system.

30. A projection type display apparatus comprising an optical system for condensing light from a light source and illuminating an image display device therewith, said image display device comprising a display part in which a plurality of pixels are arrayed, and a microlens array placed on the light incidence side of the display part, and a projection optical system for projecting image information from the image display device, said projection type display apparatus satisfying the following condition:

$$0.35 < K7 < 0.85$$

where $K7 = Fpj/Fmicro$ where Fpj: an F-number of said projection optical system, and Fmicro: an F-number of said microlens array.

31. An illumination apparatus comprising an optical system for condensing light from a light source and illuminating an image display device therewith, said image display device comprising a display part in which a plurality of pixels of a rectangular shape are arrayed, and microlens arrays placed on the light incidence side and on the light emergence side of the display part, said illumination apparatus satisfying the following conditions:

$$1.3 < K8 < 2.5$$
$$1.3 < K9 < 2.5$$

where $K8 = fmicrok/Dmicrok$ and
$K9 = fmicros/Dmicros$ where fmicrok: a focal length of said microlens array on said light incidence side, Dmicrok: a distance between principal points on the side of said display part, of said microlens array on said light incidence side and apertures of the pixels of said display part, fmicros: a focal length of said microlens array on said light emergence side, and Dmicros: a distance between principal points on the side of said display part, of said microlens array on said light emergence side and the apertures of the pixels of said display part.

32. A projection type display apparatus comprising a first optical system for condensing light from a light source, a second optical system for illuminating an image display device with beams from the first optical system, said image display device comprising a display part in which a plurality of pixels are arrayed, and a projection optical system for projecting image information from the image display device, said projection type display apparatus satisfying the following condition:

$$0.6 < K10 < 1.6$$

where K10=Fpj/F12c where F12c: a composite F-number of said first optical system and said second optical system, and Fpj: an F-number of said projection optical system.

33. A projection type display apparatus comprising an optical system for condensing light from a light source and illuminating an image display device therewith, said image display device comprising a display part in which a plurality of pixels are arrayed, and microlens arrays placed on the light incidence side and on the light emergence side of the display part, and a projection optical system for projecting image information from the image display device, said projection type display apparatus satisfying the following conditions:

$$0.7 < K11 < 1.2$$
$$0.7 < K12 < 1.2$$

where K11=Fpj/Fmicrok and

K12=Fpj/Fmicros where Fpj: an F-number of said projection optical system,

Fmicrok: an F-number of said microlens array on said light incidence side, and

Fmicros: an F-number of said microlens array on said light emergence side.

34. The illumination apparatus according to claim 26, 27, 28, or 31, wherein said light source is located at or near the focal point of a parabolic reflector and said reflector outputs nearly parallel beams.

35. The projection type display apparatus according to claim 29, 30, 32, or 33, wherein said light source is located at or near the focal point of a parabolic reflector and said reflector outputs nearly parallel beams.

36. A projection type display apparatus which projects image information from a liquid crystal panel placed at a surface to be illuminated, which is illuminated by the illumination apparatus as set forth in claim 26, 27, 28, or 31, through a projection optical system.

37. An illumination apparatus comprising an optical system for illuminating an image display device with light from a light source, said image display device comprising a display part in which a plurality of pixels are arrayed, and a microlens array placed on the light incidence side of the display part, wherein said microlens array is comprised of a stack of plural layers, a layer having the highest refractive index out of the plural layers has a lens surface convex on the light incidence side, and an index difference between refractive indices of media on the both sides of the lens surface of the lens is not less than 0.1.

38. An illumination apparatus comprising an optical system for illuminating an image display device with light from a light source, said image display device comprising a display part in which a plurality of pixels are arrayed, and a microlens array placed on the light incidence side of the display part, wherein each microlens constituting said microlens array comprises two or more refracting surfaces having light condensing action.

39. An illumination apparatus comprising an optical system for illuminating an image display device with light from a light source, said image display device comprising a display part in which a plurality of pixels are arrayed, and a microlens array placed on the light incidence side of the display part, wherein said microlens array is comprised of a stack of plural layers and a layer having the highest refractive index out of the plural layers comprises lenses of a double-convex shape.

40. An illumination apparatus comprising an optical system for illuminating an image modulating device with light from a light source, said image modulating device comprising a display part in which a plurality of pixels are arrayed, and microlens arrays placed on the light incidence side and on the light emergence side of the display part, wherein a layer having the highest refractive index out of layers forming said microlens array on the light incidence side has a lens surface convex on the light incidence side and an index difference between refractive indices of media on the both sides of the lens surface is not less than 0.1 and wherein a layer having the highest refractive index out of layers forming the microlens array on the light emergence side has a lens surface convex on the light emergence side and an index difference between refractive indices of media on the both sides of the lens surface is not less than 0.2.

41. An illumination apparatus comprising an optical system for illuminating an image display device with light from a light source, said image display device comprising a display part in which a plurality of pixels are arrayed, and microlens arrays placed on the light incidence side and on the light emergence side of the display part, wherein each of said microlens arrays is comprised of a stack of plural layers and a layer having the highest refractive index out of the plural layers forming the microlens array comprises lenses of a double-convex shape.

42. An illumination apparatus comprising an optical system for illuminating an image display device with light from a light source, said image display device comprising a display part in which a plurality of pixels are arrayed, and microlens arrays placed on the light incidence side and on the light emergence side of the display part, wherein each of the microlens array on the light incidence side and the microlens array on the light emergence side is an array of lenses, each lens comprising two or more refracting surfaces having light condensing action.

43. The illumination apparatus according to either one of claims 37 to 42, wherein said light source is located at or near the focal point of a parabolic reflector and said reflector outputs nearly parallel beams.

44. A projection type display apparatus which projects image information from a liquid crystal panel placed at a surface to be illuminated, which is illuminated by the illumination apparatus as set forth in either one of claims 37 to 42, through a projection optical system.

* * * * *

UNITED STATES PATENT AND TRADEMARK OFFICE
CERTIFICATE OF CORRECTION

PATENT NO. : 6,344,929 B1
DATED : February 5, 2002
INVENTOR(S) : Saburo Kabushiki It is certified that error appears in the above-identified patent and that said Letters Patent is hereby corrected as shown below:

Column 11,
Lines 50-51, delete "view of Numerical Example 1 of the image" and insert therefor
-- view of Example 1 of the display part of the image --
Lines 53-54, delete "view of Numerical Example 3 of the image" and insert therefor
-- view of Example 3 of the display part of the image --
Lines 56-57, delete "view of Numerical Example 4 of the image" and insert therefor
-- view of Example 4 of the display part of the image --
Lines 59-60, delete "view of Numerical Example 5 of the image" and insert therefor
-- view of Example 5 of the display part of the image --
Lines 62-63, delete "view of Numerical Example 6 of the image" and insert therefor
-- view of Example 6 of the display part of the image --
Lines 65-66, delete "view of Numerical Example 7 of the image" and insert therefor
-- view of Example 7 of the display part of the image --

Column 14,
Line 19, after "8" please insert -- (Example 1 of Liquid Crystal Microlens) --
Line 31, after "index" please insert -- (Example 2 Liquid Crystal Microlens) --
Line 47, after "example" please insert -- (Example 3 of Liquid Crystal Microlens) --

Column 15,
Line 18, after "example" please insert -- (Example 4 of Liquid Crystal Microlens) --
Line 37, after "8" please insert -- (Example 5 of Liquid Crystal Microlens) --
Line 63, after "8" please insert -- (Example 6 of Liquid Crystal Microlens) --

Column 16,
Line 21, after "8" please insert -- (Example 7 of Liquid Crystal Microlens) --

Column 20,
Lines 28-29, please delete "the microlens-integrated liquid crystal panel of Fig." to
-- the liquid crystal microlens example 1 shown in Fig. --
Lines 31-32, 33-34 and 36-37, please delete "the microlens- integrated liquid crystal panel of Fig." to -- the liquid crystal microlens example 1 shown in Fig. --
Lines 38-39, 40-41, 43-44 and 45-46, please delete "the microlens- integrated liquid crystal panel of Fig." to -- the liquid crystal microlens example 4 shown in Fig. --
Lines 47-48, 50-51, 52-53, 55-56 and 62-63, please delete "the microlens- integrated liquid crystal panel of Fig." to -- the liquid crystal microlens example 6 shown in Fig. --
Lines 57-58, 59-60, 64-65 and 66-67, please delete "the microlens- integrated liquid crystal panel of Fig." to -- the liquid crystal microlens example 3 shown in Fig. --

UNITED STATES PATENT AND TRADEMARK OFFICE
CERTIFICATE OF CORRECTION

PATENT NO. : 6,344,929 B1
DATED : February 5, 2002
INVENTOR(S) : Saburo Kabushiki It is certified that error appears in the above-identified patent and that said Letters Patent is hereby corrected as shown below:

Column 21,
Lines 1-2, 3-4, 6-7, 9-10 and 11-12, please delete "the microlens- integrated liquid crystal panel of Fig." to -- the liquid crystal microlens example 5 shown in Fig. --
Lines 14-15, 16-17, 19-20, 21-22 and 24-25, please delete "the microlens- integrated liquid crystal panel of Fig." to -- the liquid crystal microlens example 7 shown in Fig. --

Column 22,
Lines 58-59, 61-62, 63-64 and 66-67, please delete "with the modification of the microlens-integrated liquid crystal panel of Fig. 4" to -- with the liquid crystal microlens example 2 not shown in the drawings. --.

Signed and Sealed this

Twenty-eighth Day of January, 2003

JAMES E. ROGAN
*Director of the United States Patent and Trademark Office*